US006666558B1

(12) United States Patent
Yamagishi et al.

(10) Patent No.: US 6,666,558 B1
(45) Date of Patent: Dec. 23, 2003

(54) PROJECTION IMAGE DISPLAY

(75) Inventors: Shigekazu Yamagishi, Osaka (JP); Atsushi Hatakeyama, Osaka (JP); Hitoshi Noda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/763,936

(22) PCT Filed: Jun. 28, 2000

(86) PCT No.: PCT/JP00/04282

§ 371 (c)(1),
(2), (4) Date: Feb. 27, 2001

(87) PCT Pub. No.: WO01/02906

PCT Pub. Date: Jan. 11, 2001

(30) Foreign Application Priority Data

Jul. 2, 1999 (JP) ............................................. 11-188736
Jul. 16, 1999 (JP) ............................................. 11-203067

(51) Int. Cl.⁷ ................................................. G03B 21/26
(52) U.S. Cl. ............................................ 353/94; 353/84
(58) Field of Search ................................ 353/94, 31, 84

(56) References Cited

U.S. PATENT DOCUMENTS

| | | |
|---|---|---|
| 5,150,205 A | 9/1992 | Um et al. |
| 5,282,121 A | 1/1994 | Bornhorst et al. |
| 5,504,544 A | 4/1996 | Dreyer et al. |
| 5,560,697 A * | 10/1996 | Lim et al. .................... 348/771 |
| 5,648,860 A * | 7/1997 | Ooi et al. ....................... 349/10 |
| 5,650,832 A * | 7/1997 | Poradish et al. ............. 348/743 |
| 5,765,934 A * | 6/1998 | Okamori et al. ............... 353/38 |
| 5,836,664 A | 11/1998 | Conner et al. |
| 6,028,703 A * | 2/2000 | Sekine et al. .................. 353/20 |
| 6,144,426 A * | 11/2000 | Yamazaki et al. .............. 349/5 |
| 6,147,720 A * | 11/2000 | Guerinot et al. ............. 348/743 |
| 6,224,217 B1 * | 5/2001 | Tanaka ......................... 353/31 |
| 6,371,617 B1 * | 4/2002 | Nishida et al. ............. 353/102 |

FOREIGN PATENT DOCUMENTS

| | | |
|---|---|---|
| JP | 2-119005 | 5/1990 |
| JP | 5-150213 | 6/1993 |
| JP | 6-242397 | 9/1994 |
| JP | 6-265887 | 9/1994 |
| JP | 8-201755 | 8/1996 |
| JP | 9-185902 | 7/1997 |

OTHER PUBLICATIONS

Asia Display '95 (pp. 95–98).

* cited by examiner

Primary Examiner—Russell Adams
Assistant Examiner—D. Ben Esplin
(74) Attorney, Agent, or Firm—Merchant & Gould, P.C.

(57) ABSTRACT

A projection display system includes: two light sources (102, 105); a condenser (103, 106) for condensing the light from the light sources; a time-division color separating optical system (108) for temporally switching the incident light into a first, second, or third color of light to be emitted; a light valve (118) capable of modulating the incident light individually for each pixel; a lighting optical system (111, 112, 114) for directing the light from the time-division color separating optical system onto the light valve, and a projection optical system (123) for magnifying and projecting a pixel on the light valve. The light from the two light sources (102, 105) is condensed on the time-division color separating optical system or its vicinity by the condenser (103, 106), and then superimposed. This can provide a projection display system that performs time-division driving and can achieve high-brightness projection images without increasing the size and cost of a system.

17 Claims, 21 Drawing Sheets

515  513

PROJECTION IMAGE DISPLAY

TECHNICAL FIELD

First Invention

The present first invention relates to a projection display system that displays images by driving one light valve in response to light signals that present different colors temporally (time-division driving).

Second Invention

The present second invention relates to a projection display system that magnifies and projects images generated by a reflection-type light valve without relying on a polarizing beam splitter (hereinafter, referred to as PBS).

BACKGROUND ART

First Invention

The market for large-scale image display systems that are used primarily for presentation is growing rapidly today. A wide range of applications, from portable displays to extremely large screens used in halls or the like, is included in this market. The common requirements to be met by the individual display systems for such applications are high brightness, low cost, and miniaturization. There are two types of projection display systems: three-plate and single-plate. The three-plate type is provided with light valves, one each for R (red), G (green), and B (blue). The single-plate type is provided with one light valve for displaying color images. To meet the above-described requirements, in particular, to achieve cost reduction, the projection display systems of the single-plate type have been used increasingly in recent years.

The single-plate type also can be classified broadly into two systems: one is a system using a light valve provided with pixels corresponding to each of the RGB colors; the other is a system using a light valve that displays images by changing modulation factors temporally in response to each of the RGB signals with the same pixel.

The first system can have a simple configuration. However, the quality of projection images is poor, strictly speaking, as the RGB in those images are displaced. On the other hand, the second system can provide good image quality without displacement of the RGB. However, its configuration is more complex than the first system.

The present invention is intended to improve the second system.

Hereinafter, the second system, i.e., a single-plate display system employing time-division driving, will be described. In this display system, a light valve is driven at a speed that is three times as fast as the conventional one in response to each of the input signals of RBG. It is necessary that the incident light on the light valve also be switched correspondingly.

A lighting system that illuminates a subject by switching white light sequentially to the RBG colors of light is disclosed in, e.g., JP 2-119005 A. FIG. 7 shows a schematic configuration of the lighting system. The light from a light source 301, which emits white light, passes through a condenser lens 302 and a color wheel 303 into the incident end of a light guide 304. Then, the light is projected onto a subject for observation from the exit end of the light guide. In this case, the color wheel 303 is a rotating disk formed of three fan-shaped filters. The three filters are as follows: a red-transmission filter for passing only light in the wavelength range of red, a green-transmission filter for passing only light in the wavelength range of green, and a blue-transmission filter for passing only light in the wavelength range of blue. The color wheel 303 is rotated by a motor 305. The rotation of the color wheel 303 allows the subject to be illuminated with red, green, and blue light that is switched sequentially.

The above lighting system is applied to a projection display system, which is disclosed in, e.g., JP 9-185902 A. FIG. 8 shows a schematic configuration of the projection display system. The light emitted from a light source 401 is reflected from a reflecting mirror 402 toward the opening thereof. Then, only visible light is reflected from a reflecting mirror 403 provided with a filter for rejecting ultraviolet and infrared rays, and its optical path is deflected by 90 degrees. The reflected visible light passes through a brightness-modulation filter 405 and color-modulation filters 404a, 404b, and 404c in this order, so that the entire brightness of the light is modulated. Then, the light enters a color wheel 406. The color wheel 406 is provided with a tri-color filter including: a filter for passing only light in the wavelength range of red; a filter for passing only light in the wavelength range of green, and a filter for passing only light in the wavelength range of blue. By rotating the color wheel 406, the color of the light passing through the color wheel can be selected sequentially. The transmitted light is collimated by a condenser lens 407 into parallel light, reflected from a mirror 408, and enters a projection gate 409. Then, the light is modulated and emitted from the projection gate 409 and directed through a relay lens 410 and a stop 411 to a projection lens 412. Thus, an image on the projection gate 409 is magnified and projected onto a screen (not shown). At this time, a color signal that drives the projection gate 409 and a color of the light passing through the color wheel 406 are synchronized, so that modulation can be performed in accordance with a color of the light entering the projection gate 409. This makes it possible to display color images with a single light valve. In the above configuration, the light from the light source 401 is condensed on the color wheel 406 or its vicinity. This is because the size of the color wheel 406 is reduced and a period of color mixture is minimized; the color mixture occurs when the incident light on the color wheel 406 passes through two different adjacent color selecting filters at the same time.

As described above, when a rotating color wheel is used for time-division driving, it is preferable that an image of the light source is small, which is condensed and formed on a color selecting filter of the color wheel or its vicinity. On the other hand, since the time-division driving basically reduces the optical output of a system to one-third, a light source that can provide high brightness is necessary. However, a discharge tube is used generally as the light source of a projection display system. Therefore, to achieve high brightness as well as practical lifetime, the distance between electrodes is increased and a light-emitting portion becomes large. When such a light source with high-brightness and a large light-emitting portion is used, the image of the light source that is condensed and formed on a color selecting filter of the color wheel or its vicinity also becomes large. This causes an increase in the size of the rotating color wheel, the degradation of projection images because of color mixture, or the like.

Thus, for a conventional projection display system that performs time-division driving with a rotating color wheel, it has been difficult to achieve high brightness.

Second Invention

The market for large-scale image display systems that are used primarily for presentation is growing rapidly today. A wide range of applications, from portable displays to extremely large screens used in halls or the like, is included in this market. The common requirements to be met by the individual display systems for such applications are high brightness, high resolution, low cost, and miniaturization. It should go without saying that the selection of a light source suitable for each device size and the optimization of optical systems are needed to satisfy these requirements.

Hereinafter, an example of a configuration of a conventional projection display system employing a reflection-type light valve will be described.

A first conventional technique that is disclosed in JP 5-150213 A will be described. As shown in FIG. 19, among the light from a light source 701, the light reflected from a reflector 702 passes through a polarizing plate 703 and enters a reflection-type liquid crystal panel 704. The reflection-type liquid crystal panel 704 modulates the incident polarized light to image light corresponding to an image to be displayed and reflects it diagonally. The reflected light passes through the polarizing plate 703 again and is projected onto a screen 705 by a projection lens 706. Thus, an image on the reflection-type liquid crystal panel 704 can be magnified and projected onto the screen.

Before JP 5-150213 A was published, a configuration including a reflection-type liquid crystal panel was such that a polarizing beam splitter (PBS) is arranged near the reflection-type liquid crystal panel. However, JP 5-150213 A has achieved the improvement in contrast and the reduction in cost by removing a PBS.

Next, a second conventional technique will be described, in which images are displayed by modulating the emission angle of the incident light without depending on polarization, like an AMA reflection-type light valve, introduced at the ASIA DISPLAY '95. FIG. 20 shows a configuration disclosed in U.S. Pat. No. 5,150,205. The light 801 emitted from a light source (not shown) is reflected from reflecting surfaces 802 provided for each pixel in a reflection-type light valve. The reflecting surfaces 802 can be inclined individually at different angles. For displaying white, the reflecting surface 802 is not inclined, so that the light incident on this surface passes through an aperture 804 in a stop 803, then reaches a projection lens 805, and is magnified and projected. On the other hand, for displaying black, the reflecting surface 802 is inclined at predetermined angles, so that the light incident on this surface is blocked by the stop 803. Therefore, the light does not pass through the aperture 804 in the stop 803 to the projection lens 805, resulting in a black portion on a screen. In this configuration, a polarizer and analyzer made of an organic material are not used, and thus the structure is simple.

FIG. 21 shows a third conventional technique employing a similar reflection-type light valve. A projection display system according to this technique includes a light source 901, a lighting optical system 902, a schlieren optical system 903, a reflection-type light valve 904, and a projection optical system 905. The light from the light source 901 is incident on schlieren bars 906 through the lighting optical system 902. The light reflected from the schlieren bars passes through a schlieren lens 907 into the reflection-type light valve 904. The reflection-type light valve 904 is provided with many reflecting mirrors, each of which is the same as that shown in FIG. 20. Since the mirror arranged at the portion to be displayed in black reflects the incident light back to its path, the light thus reflected returns to the optical path on the light source side through the schlieren lens 907 and the schlieren bars 906 again. On the other hand, the mirror arranged at the portion to be displayed in white is inclined with respect to the incident light. Therefore, the incident light is reflected in the direction that is different from its path. The reflected light thus deflected is focused by the schlieren lens 907 to form an image on the surface of the schlieren bar 906. However, the imaging position is between the bars, so that the light can pass through here. The transmitted light enters the projection optical system 905. Thus, an image on the reflection-type light valve 904 can be magnified and projected. In this configuration, the light source conditions can be made without depending directly on the emission angle (the amount of modulation) of the light entering the reflection-type light valve 904.

However, each of the conventional projection display systems described above has the following problems.

Referring to the first configuration (shown in FIG. 19), when the angle of incidence of the light entering the reflection-type light valve 704 is large, contrast cannot be maintained because of the dependence on the incidence angle when a liquid crystal is used as a reflection-type light valve 704. Moreover, when the angle between the optical axis of the light reflected from the reflection-type light valve 704 and the optical axis of the projection optical system is large, an image is projected at a large elevation angle. Thus, the position where a projection image is displayed is limited practically. For these reasons, it is preferred to reduce the angle of incidence of the light entering the reflection-type light valve.

Furthermore, when the interference between the light incident on and reflected from the reflection-type light valve 704 is caused, or can be caused, structural difficulties arise in forming a system. Thus, like the above, it is necessary to reduce the angle of incidence of the light entering the reflection-type light valve.

However, to reduce the angle of incidence, it is required to increase the degree to which the light entering the reflection-type light valve from the lighting optical system is collimated. To increase such a degree, i.e., to increase a lighting F number, a light source having a small light-emitting portion should be used. Even if a light source having a large light-emitting portion is used, it cannot be utilized efficiently. Therefore, the light source to be used is limited to a discharge tube-type lamp with a short arc, so that it is difficult to provide sufficiently bright images.

In the second configuration (shown in FIG. 20), a reflection-type light valve displays images by modulating the emission angle of the incident light without depending on polarization. Like the first configuration described above, when the interference between the light incident on and reflected from the reflection-type light valve is caused, or can be caused, structural difficulties arise in forming a system. Thus, it is necessary to reduce the angle of incidence of the light entering the reflection-type light valve.

In addition to this, if the reflecting surfaces provided in the reflection-type light valve are inclined at sufficiently large angles upon modulation, there is no problem. However, the inclination angle is extremely small, i.e., 5 degrees, according to the above document. In this case, half of the angle of divergence of the incident light should be not more than 5 degrees. Thus, like the first configuration, a larger lighting F number is necessary, so that a light source is limited, resulting in insufficient brightness.

In the third configuration (shown in FIG. 21), like the second configuration, a reflection-type light valve displays images by modulating the emission angle of the incident light. Here, a schlieren optical system is used, so that a lighting F number is not limited by the inclination angle of the respective reflecting surfaces in the reflection-type light valve. However, to transmit light without losses, it is necessary to design a schlieren lens while taking into account the inclination angle of the respective reflecting surfaces. This means that the F number of the schlieren lens is lowered, which increases the set size and the cost.

SUMMARY OF THE INVENTION

First Invention

It is an object of the present first invention to solve the above conventional problems and provide a projection display system that performs time-division driving and achieves a high-brightness projection image without increasing the size and cost of a system.

To achieve the above object, the present first invention has the following configuration.

A projection display system of the present first invention includes: a light source; a condenser for condensing the light from the light source; a time-division color separating optical system for temporally switching the incident light to a first, second, or third color of light to be emitted; a light valve capable of modulating the incident light individually for each pixel; a lighting optical system for directing the light from the time-division color separating optical system onto the light valve, and a projection optical system for magnifying and projecting a pixel on the light valve. The number of the light source and the condenser is two, respectively. The light from the light sources is condensed on the time-division color separating optical system or its vicinity by the condensers, and both condensing positions are superimposed.

In this configuration, the light from the two light sources is condensed on the time-division color separating optical system or its vicinity to form images of the light sources, respectively, and the two light source images are superimposed. Therefore, the light from the light sources can be doubled while keeping the condensed and superimposed images of the light sources small. Thus, a projection image with high brightness can be achieved. Also, it is not necessary to provide a large-sized time-division color separating optical system, so that an increase in the size of a system can be prevented and a rise in the cost can be suppressed as well. In addition, since the small superimposed images of the light sources are formed in the vicinity of the time-division color separating optical system, the degradation of images caused by color mixture can be prevented.

In the above configuration, the condenser may be an umbrella-type reflector provided with an elliptical reflecting surface. Alternatively, the condenser may include an umbrella-type reflector provided with a parabolic reflecting surface and optical components having a convex-lens effect.

Furthermore, in the above configuration, it is preferable that the lighting optical system includes a lens for collimating the light from the time-division color separating optical system into substantially parallel light and an integrated optical system; the integrated optical system includes a first lens array that divides the incident light into separate rays of light to form secondary images of the light source and a second lens array provided with a plurality of microlenses arranged at the positions where the secondary images of the light source are formed. The use of the integrated optical system in the lighting optical system allows for the improvement of utilization efficiency of the light from the light sources and the uniform luminance distribution in a projection image.

In the above configuration, the light valve may be a reflection-type light valve. In this case, it is preferable that the shape of an exit pupil formed in the lighting optical system, which can be taken as a light-emitting surface when the lighting optical system is viewed from the reflection-type light valve, is such that the size in the direction parallel to a plane containing the axes of the light incident on and reflected from the reflection-type light valve is smaller than that in the direction perpendicular to that plane, and that the following relationship is established:

F1>1/(2 sin (θ1/2))

F2<1/(2 sin (θ1/2))

where, among a lighting F number relative to the reflection-type light valve, F1 represents the lighting F number in the direction parallel to the plane containing the axes of the light incident on and reflected from the reflection-type light valve, F2 represents the lighting F number in the direction perpendicular to that plane, and θ1 represents the angle between the light incident on the reflection-type light valve and the light reflected from the reflection-type light valve into the projection optical system.

This preferred configuration can improve the efficiency of condensing light on the reflection-type light valve, resulting in high efficiency and high brightness. Moreover, the degree of freedom in light source arrangement is increased, which facilitates the design of a system.

In the above configuration, a reflection-type light valve that can control the polarization directions of incident light individually for each pixel may be used as the reflection-type light valve described above. Moreover, a polarizer may be provided on an optical axis on the incident side of the reflection-type light valve and an analyzer may be provided on an optical axis on the exit side thereof. Alternatively, a reflection-type light valve provided with reflecting surfaces whose inclination angle can be controlled individually for each pixel may be used as the reflection-type light valve described above. Moreover, the reflection-type light valve may display an image in such a manner that the inclination angle of the respective reflecting surfaces is controlled so as to change the emission angle of light, and thereby light to be incident on the projection optical system is selected for each pixel.

Furthermore, it is preferable that the lighting optical system includes a lens for collimating the light from the time-division color separating optical system into substantially parallel light and an integrated optical system; the integrated optical system includes a first lens array that divides the incident light into separate rays of light to form secondary images of the light source and a second lens array provided with a plurality of microlenses arranged at the positions where the secondary images of the light source are formed; and the entire shape of the second lens array is such that the size in the direction parallel to a plane containing the axes of the light incident on and reflected from the reflection-type light valve is smaller than that in the direction perpendicular to that plane. This preferred configuration can increase efficiency, brightness, and the freedom degree in the system structure.

Furthermore, it is preferable that a plane containing a system axis and the two light sources is perpendicular to a plane containing the axes of the light incident on and reflected from the reflection-type light valve. This preferred configuration can reduce the size of a system in the direction parallel to the plane containing the axes of the light incident on and reflected from the reflection-type light valve.

Furthermore, it is possible that the time-division color separating optical system is a rotating color wheel having a light selecting means that is placed on the circumference of a circle whose center is the center of rotation of the color wheel and separates the incident white light into a first, second, or third color of light to be emitted. This can provide a simple, low-cost, and highly efficient color selection.

Second Invention

It is an object of the present second invention to solve the above conventional problems and provide a projection display system that can increase the freedom degree in the above optical limitations resulting from the use of a reflection-type light valve, specifically in the F number setting for lighting and projection systems, and that can be optimized in accordance with different applications. In particular, the present invention has an object of achieving high-brightness projection images and a highly efficient system in such a manner that a lighting F number relative to a reflection-type light valve is reduced, and thus the light from a light source having a large light-emitting portion can be condensed.

To achieve the above objects, the present second invention has the following configuration.

A first configuration of a projection display system of the present second invention includes: a light source; a lighting optical system for condensing the light from the light source on the desired position; a reflection-type light valve capable of modulating the light from the lighting optical system individually for each pixel, and a projection optical system for magnifying and projecting a pixel on the reflection-type light valve. The shape of an exit pupil formed in the lighting optical system, which can be taken as a light-emitting surface when the lighting optical system is viewed from the reflection-type light valve, is such that the size in the direction parallel to a plane containing the axes of the light incident on and reflected from the reflection-type light valve is smaller than that in the direction perpendicular to that plane. Furthermore, the following relationship is established:

$F1 > 1/(2 \sin(\theta1/2))$ $F2 < 1/(2 \sin(\theta1/2))$ where, among a lighting F number relative to the reflection-type light valve, F1 represents the lighting F number in the direction parallel to the plane containing the axes of the light incident on and reflected from the reflection-type light valve, F2 represents the lighting F number in the direction perpendicular to that plane, and $\theta1$ represents the angle between the light incident on the reflection-type light valve and the light reflected from the reflection-type light valve into the projection optical system.

As described above, the appearance of a light-emitting portion in the lighting optical system when viewed from the reflection-type light valve, i.e., a lighting F number, is optimized in two directions; one is parallel to a plane formed by the light incident on and reflected from the reflection-type light valve and the other is perpendicular to that plane. Thus, a lighting F number can be smaller than that in a conventional configuration, so that light diverging at larger angles also can be utilized. Therefore, a light source having a larger light-emitting portion can be used, which improves the efficiency of condensing light from the light source, resulting in high-brightness projection images and a highly efficient system. Also, the size of an exit pupil in the direction parallel to the plane formed by the light incident on and reflected from the reflection-type light valve is reduced, which allows the system size in that direction to be small.

In the first configuration, a reflection-type light valve that can control the polarization directions of the incident light individually for each pixel may be used as the reflection-type light valve described above. Moreover, a polarizer may be provided on an optical axis on the incident side of the reflection-type light valve and an analyzer may be provided on an optical axis on the exit side thereof. Alternatively, a reflection-type light valve provided with reflecting surfaces whose inclination angle can be controlled individually for each pixel may be used as the reflection-type light valve described above. Moreover, the reflection-type light valve may display an image in such a manner that the inclination angle of the respective reflecting surfaces is controlled so as to change the emission angle of light, and thereby light to be incident on the projection optical system is selected for each pixel.

Furthermore, a second configuration of a projection display system of the present second invention includes: a light source; a lighting optical system for condensing the light from the light source on the desired position; a reflection-type light valve provided with reflecting surfaces whose inclination angle can be controlled individually for each pixel and modulating the light from the lighting optical system by controlling the inclination angle of the respective reflecting surfaces, and a projection optical system for magnifying and projecting a pixel on the reflection-type light valve. A schlieren optical system including schlieren bars and a schlieren lens is arranged between the lighting optical system and the reflection-type light valve. The shape of an exit pupil formed in the lighting optical system, which can be taken as a light-emitting surface when the lighting optical system is viewed from the schlieren bars, is such that the size in the direction parallel to a plane containing the axes of the light incident on and reflected from the reflection-type light valve is smaller than that in the direction perpendicular to that plane. Moreover, $\sin^{-1}(F4/2)$ and $\theta2/2 + \sin^{-1}(F3/2)$ are substantially equal, where, among a lighting F number relative to the schlieren bars, F3 represents the lighting F number in the direction parallel to the plane containing the axes of the light incident on and reflected from the reflection-type light valve, F4 represents the lighting F number in the direction perpendicular to that plane, and $\theta2$ represents the angle between the light incident on the reflection-type light valve and the light reflected from the reflection-type light valve into the projection optical system.

In this configuration, the appearance of a light-emitting portion in the lighting optical system when viewed from the schlieren bars is optimized in two directions; one is parallel to a plane formed by the light incident on and reflected from the reflection-type light valve and the other is perpendicular to that plane. Thus, a lighting F number can be smaller than that in a conventional configuration, so that light diverging at larger angles also can be utilized. Therefore, a light source having a larger light-emitting portion can be used, which improves the efficiency of condensing light from the light source, resulting in high-brightness projection images and a highly efficient system. Also, the size of an exit pupil in the direction parallel to the plane formed by the light incident on and reflected from the reflection-type light valve is reduced, which allows the system size in that direction to be small. On the other hand, a small-sized general lens can be used as a schlieren lens, so that an increase in the cost can be minimized.

In the first and second configuration, it is preferable that the lighting optical system is an integrated optical system including a first lens array that divides the light from the light source into separate rays of light to form secondary images of the light source and a second lens array provided with a plurality of microlenses arranged at the positions where the secondary images of the light source are formed; the entire shape of the second lens array is such that the size in the direction parallel to a plane containing the axes of the light incident on and reflected from the reflection-type light valve is smaller than that in the direction perpendicular to that plane. The use of the integrated optical system in the lighting optical system allows for the improvement of utilization efficiency of the light from the light source and the uniform luminance distribution in a projection image. In addition, the second lens array has the entire shape as described above, which can increase efficiency, brightness, and the degree of freedom in the system structure.

DETAILED DESCRIPTION OF THE INVENTION

First Invention

Embodiment I-1

Figure 1:
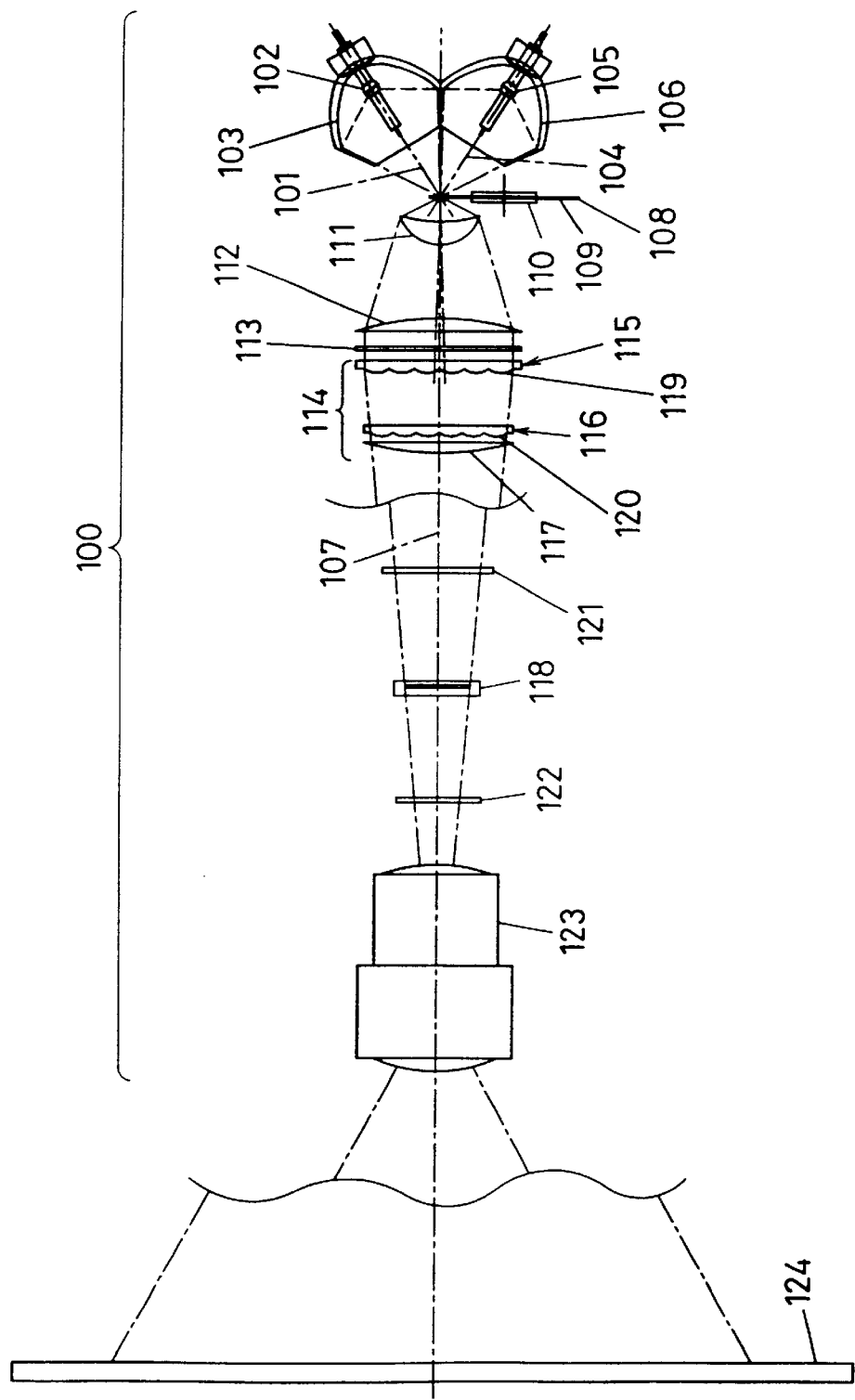
FIG. 1 shows a schematic configuration of a projection display system of Embodiment I-1 of the present first invention.

FIG. 1 shows a schematic configuration of a projection display system 100 of Embodiment I-1. The projection display system 100 of this embodiment is provided with a first light source 102 on the optical axis 101 of a first lamp, a first elliptical mirror 103, a second light source 105 on the optical axis 104 of a second lamp, and a second elliptical mirror 106. The first elliptical mirror 103 has a reflecting surface in the basic form that is rotationally symmetrical with respect to the optical axis 101. Similarly, the second elliptical mirror 106 has a reflecting surface in the basic form that is rotationally symmetrical with respect to the optical axis 104. Each of the first and the second elliptical mirror has two focal points: The first light source 102 is located at one focal point of the first elliptical mirror 103, and the second light source 105 is located at one focal point of the second elliptical mirror 106; the two elliptical mirrors 103, 106 are arranged so that the optical axis 101 and the optical axis 104 intersect at the other focal points of the elliptical mirrors, which are different from the focal points where the light sources are placed. Moreover, the two elliptical mirrors 103, 106 are adjacent to each other with a system axis 107 sandwiched therebetween and arranged so that the distance between the light beams traveling through the outermost side in the direction where the elliptical mirrors are close to each other is minimized.

Figure 2:
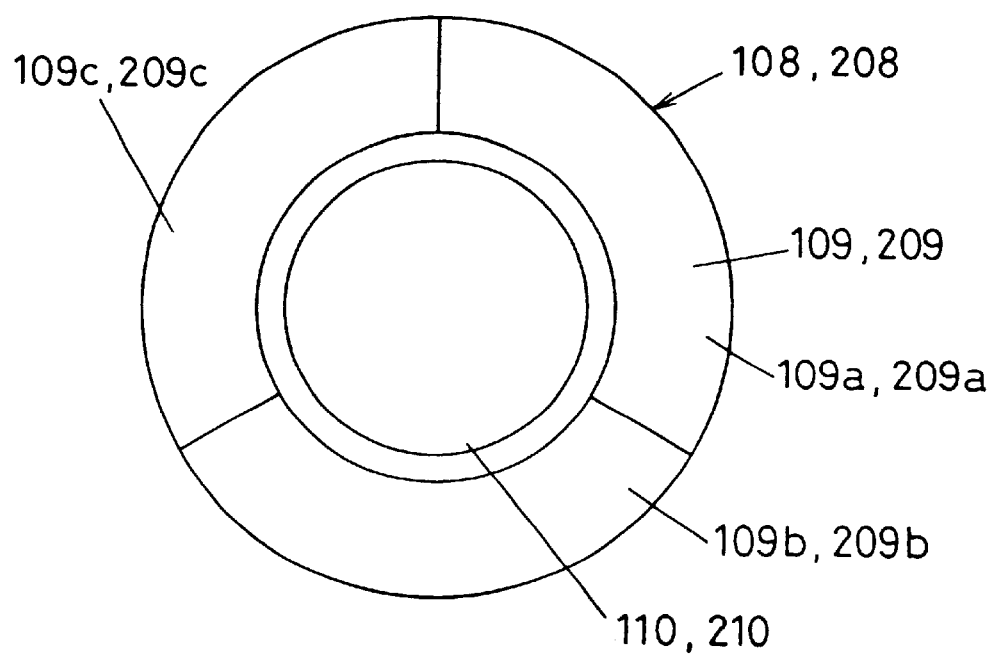
FIG. 2 is a front view showing a configuration of a color wheel used in a projection display system of the present first invention.

As shown in FIG. 1, a color wheel 108 is arranged so that a color filter portion 109 of the color wheel 108 is located at the intersection of the optical axes 101 and 104. The color wheel 108 is a disk having the ring-shaped color filter portion 109, as shown in FIG. 2. The color filter portion 109 is divided into three parts at substantially equal angles: a blue-transmission dichroic filter 109a, a green-transmission dichroic filter 109b, and a red-transmission dichroic filter 109c. The color wheel 108 is supported by a motor 110 at the center of the ring-shaped color filter portion 109 and rotated at high speed.

The light from the light sources 102, 105 passes through the color filter portion 109 and is collimated into substantially parallel light by passing through condenser lenses 111, 112. Then, the light passes through a filter 113 for rejecting ultraviolet and infrared rays and enters an integrated optical system 114.

Figure 3:
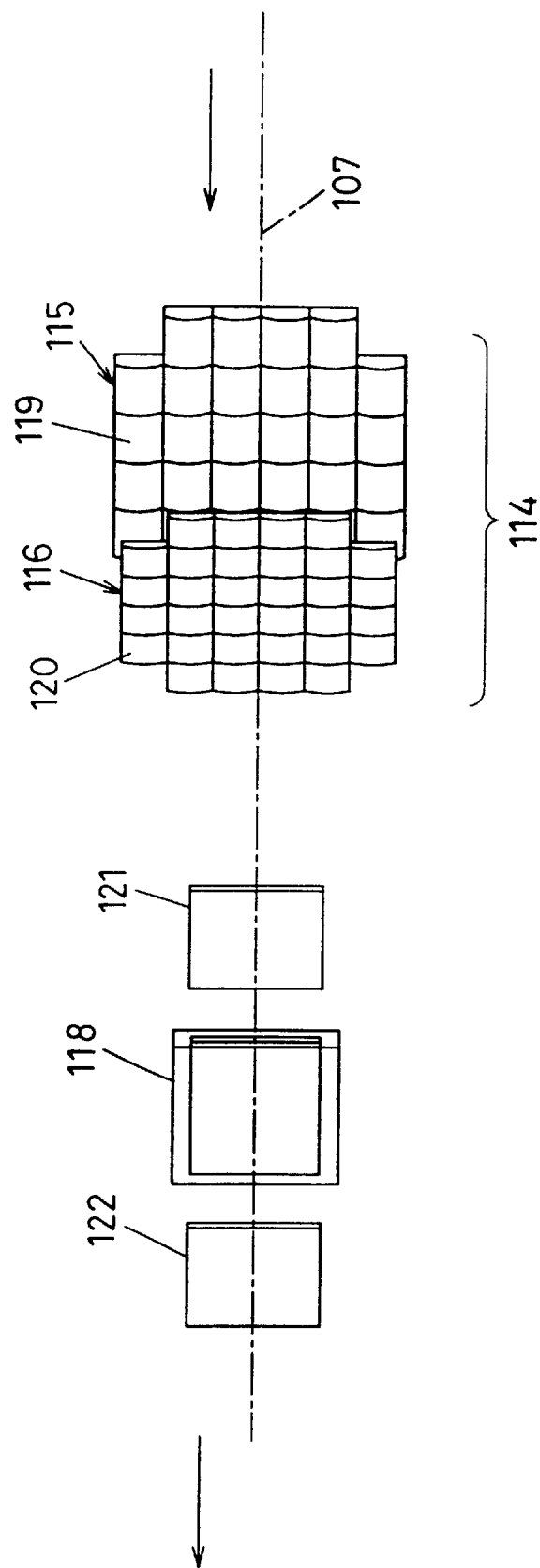
FIG. 3 is a perspective view showing a part of an optical system of a projection display system of Embodiment I-1 of the present first invention.

FIG. 3 shows a perspective view showing the optical system between the integrated optical system 114 and an analyzer 122, which will be described later. In FIG. 3, the arrow along the system axis 107 indicates the traveling direction of the light from the light sources. The description of a condenser lens 117 is omitted in FIG. 3.

The integrated optical system 114 includes a first lens array 115, a second lens array 116, and the condenser lens 117. The first lens array 115 is provided with many microlenses 119 arranged on the same plane. Each microlens 119 has an aperture that is similar in shape to the effective portion of a transmission-type liquid crystal panel 118, which will be described later. Similarly, the second lens array 116 is provided with many microlenses 120 arranged closely together on the same plane. The microlenses 120 of the second lens array 116 are arranged at the positions where secondary images of the light source are formed by each microlens 119 of the first lens array 115. Each microlens 120 magnifies the aperture shape of the corresponding microlens 119 of the first lens array 115 and projects it onto the transmission-type liquid crystal panel 118. As a result, the images of the microlenses 119 of the first lens array 115 are superimposed to illuminate the transmission-type liquid crystal panel 118 uniformly. Here, many microlenses 120 are arranged closely together so that the external shape of the second lens array 116 when viewed from the transmission-type liquid crystal panel 118 is substantially symmetrical with respect to the system axis 107, as shown in FIG. 3. At this time, each microlens 119 of the first lens array 115 is set so as to form the secondary image of the light source on the corresponding microlens 120 of the second lens array 116.

The light through the integrated optical system 114 enters a polarizer 121, where the polarized component of the light parallel to the light-absorption axis of the polarizer 121 is absorbed, so that only light having the polarized component perpendicular to that axis is transmitted and enters the transmission-type liquid crystal panel 118.

The transmission-type liquid crystal panel 118 is composed of many pixels that can modulate light individually in response to the input signals from the outside. Among the light incident on the transmission-type liquid crystal panel 118, the polarization direction of the light entering a pixel to display black on a screen is changed by 90 degrees when the light passes through the transmission-type liquid crystal panel 118. Thus, the light is absorbed by an analyzer 122. On the other hand, the polarization direction of the light entering a pixel to display white on a screen is unchanged when the light passes through the transmission-type liquid crystal panel 118. Thus, the light is transmitted through the analyzer 122 and enters a projection lens 123, which is a projection optical system. As a result, an image on the transmission-type liquid crystal panel 118 is magnified and projected onto a screen 124.

In this embodiment, it should go without saying that the driving timing for video signals is synchronized with the color of the light passing through the color wheel 108. Those video signals are input to the transmission-type liquid crystal panel 118, corresponding to the RGB colors.

With a conventional configuration merely employing two light sources (e.g., JP 6-242397 A and JP 6-265887 A), images of the light sources are large. However, the present embodiment can minimize the size of the images of the light sources by optimizing the arrangement of two light sources and superimposing two light source images formed on the rotating color wheel 108 or its vicinity. Thus, the rotating color wheel 108 can have the smallest diameter. This can provide high-brightness projection images because of a twofold increase in the light from the light sources, while reducing the size of the set, the cost, and noise during rotation, increasing reliability during rotation, and preventing color mixture.

In the above embodiment, the light from the light sources 102, 105 is condensed by the elliptical mirrors 103, 106. However, the present invention is not limited thereto. For example, the same object can be attained with the following configuration: parabolic mirrors are used instead of the elliptical mirrors 103, 106; the light sources are placed at the focal positions of the parabolic mirrors, from which light is emitted as parallel light and condensed by a convex lens or the like.

In the above embodiment, the integrated optical system is used. However, when restrictions on the cost or the like have priority over image quality, such an optical system is not necessarily needed, and the optical system may consist of, e.g., a condenser lens.

In the above embodiment, the transmission-type liquid crystal panel 118 is used as a light valve. However, the present invention is not limited thereto. It should go without saying that other configurations may be employed as long as the display system can modulate the input light in response to signals from the outside.

In a configuration of this embodiment, the angle of incidence of the light entering the color wheel 108 is larger than that in the system using a single light source. When an increase in the angle of incidence causes problems in practical use, the ends of the openings of the elliptical mirrors 103, 106, acting as reflectors of the light sources, may be cut away on the side where two mirrors are adjacent. Thus, the light sources 102, 105 are close together, so that the angle of incidence can be reduced.

The problem of red light can be improved by placing a bandpass filter near the filter 113 for rejecting ultraviolet and infrared rays of this embodiment. The bandpass filter rejects only the yellow component.

As described above, this embodiment provides a projection display system including: the light sources 102, 105; condensers (the elliptical mirrors 103, 106) for condensing the light from the light sources; a time-division color separating optical system (the color wheel 108) for temporally switching the incident light to a first, second, or third color of light to be emitted; a light valve (the transmission-type liquid crystal panel 118) capable of modulating the incident light individually for each pixel; a lighting optical system (the condenser lenses 111, 112 and the integrated optical system 114) for directing the light from the time-division color separating optical system onto the light valve, and a projection optical system (the projection lens 123) for magnifying and projecting a pixel on the light valve. In such a projection display system, the number of the light sources and the condensers is two, respectively. The light from each of the light sources is condensed on the time-division color separating optical system or its vicinity by the condensers. Both condensing positions are superimposed. In addition, the two condensers are close together optically. This can provide a projection display system that enables high brightness, low cost, and miniaturization.

Here, it is most preferable that the position, at which the images of the light sources condensed respectively by the two condensers are superimposed, is on the time-division color separating optical system (the color wheel 108). However, the position of the superimposition can be shifted somewhat in the direction of the optical axis (the system axis 107) when it can be permissible in terms of the size of the color wheel and that of the light source images.

In the case where the two elliptical mirrors 103, 106 that act as condensers cannot be close together as shown in FIG. 1 because of the restrictions on structure and reliability, a general optical means may be employed to ensure the structural distance between the elliptical mirrors 103 and 106. Such an optical means includes placing a reflecting mirror on the incident side of the time-division color separating optical system (the color wheel 108), placing an optical path changing prism, and the like. At the same time, this makes it possible to optically minimize the ineffective area of light between the two condensers, when viewed from the time-division color separating optical system (the color wheel 108).

Embodiment I-2

Figure 4:
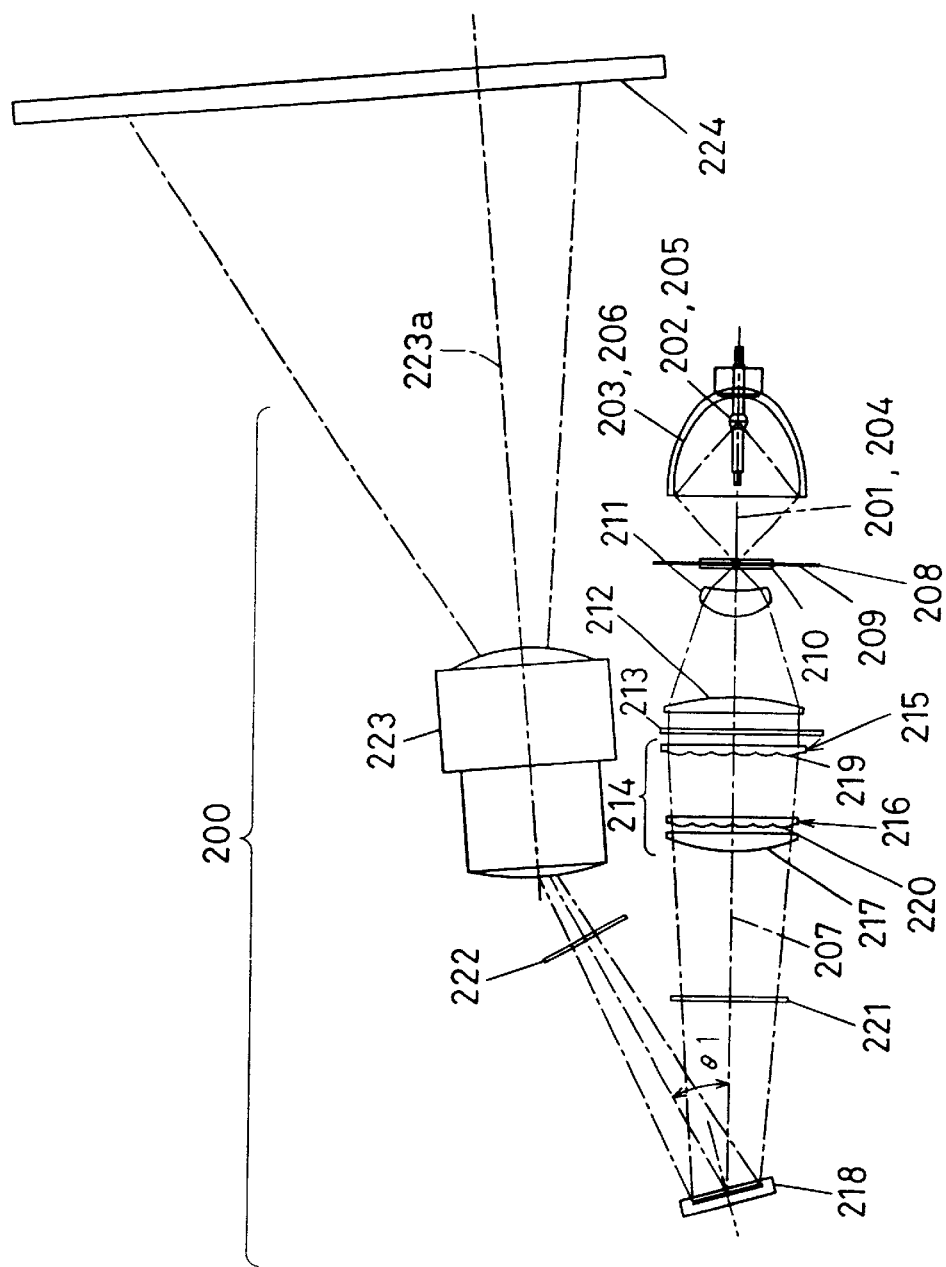
FIG. 4 is a plan view showing a schematic configuration of a projection display system of Embodiment I-2 of the present first invention.
Figure 5:
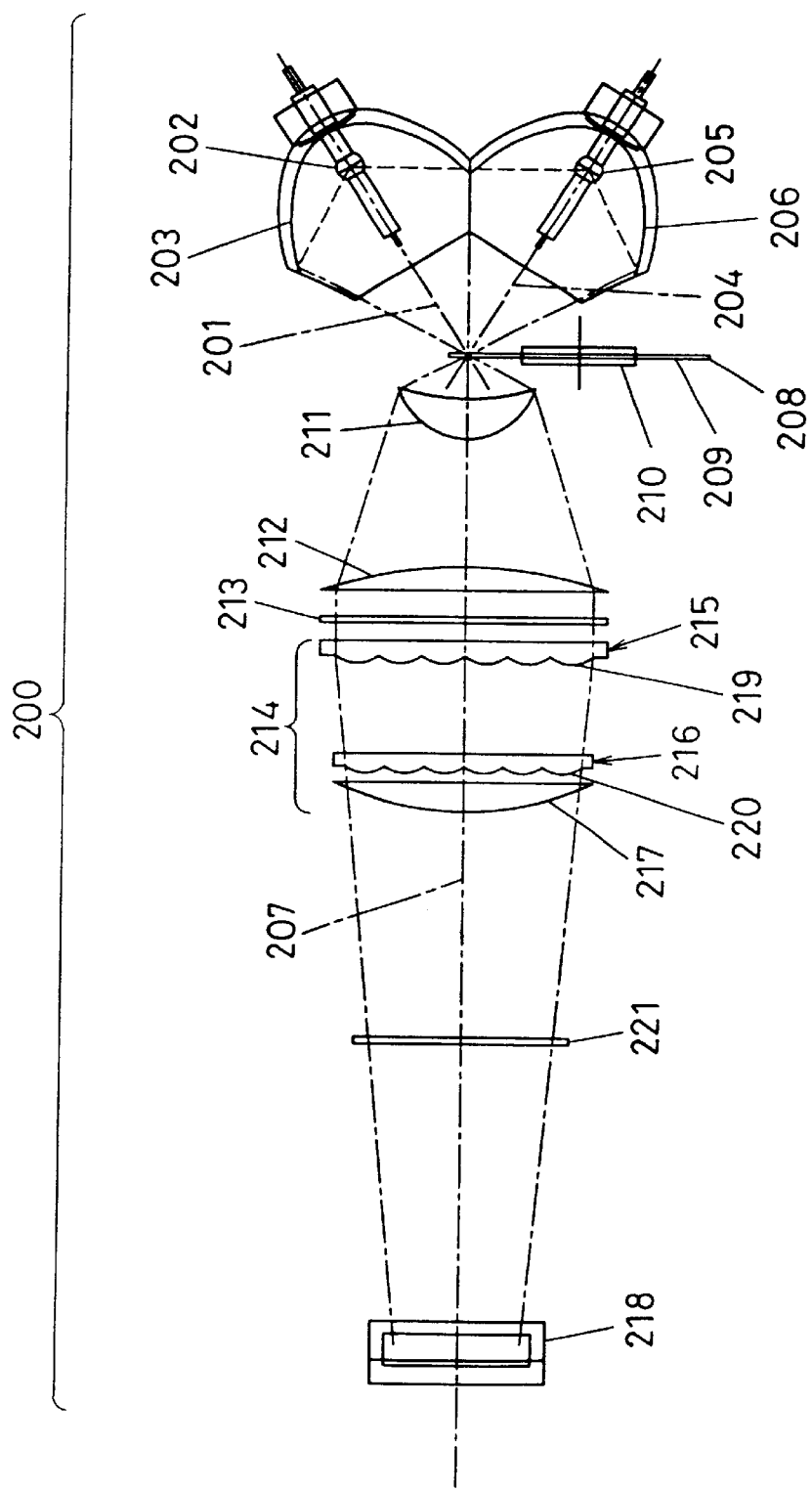
FIG. 5 is a side view showing a schematic configuration of a projection display system of Embodiment I-2 of the present first invention.

FIG. 4 is a top view showing a schematic configuration of a projection display system 200 of Embodiment I-2; FIG. 5 is a side view showing a schematic configuration (between a light source and a light valve) of the projection display system 200 of Embodiment I-2. The projection display system 200 of this embodiment is provided with a first light source 202 on the optical axis 201 of a first lamp, a first elliptical mirror 203, a second light source 205 on the optical axis 204 of a second lamp, and a second elliptical mirror 206. The first elliptical mirror 203 has a reflecting surface in the basic form that is rotationally symmetrical with respect to the optical axis 201. Similarly, the second elliptical mirror 206 has a reflecting surface in the basic form that is rotationally symmetrical with respect to the optical axis 204. Each of the first and the second elliptical mirror has two focal points: The first light source 202 is located at one focal point of the first elliptical mirror 203, and the second light source 205 is located at one focal point of the second elliptical mirror 206; the two elliptical mirrors 203, 206 are arranged so that the optical axis 201 and the optical axis 204 intersect at the other focal points of the elliptical mirrors, which are different from the focal points where the light sources are placed. Furthermore, the two elliptical mirrors 203, 206 are adjacent to each other with a system axis 207 sandwiched therebetween and arranged so that the distance between the light beams traveling through the outermost side in the direction where the elliptical mirrors are close to each other is minimized.

As shown in FIGS. 4 and 5, a color wheel 208 is arranged so that a color filter portion 209 of the color wheel 208 is located at the intersection of the optical axes 201 and 204. The color wheel 208 is a disk having the ring-shaped color filter portion 209, as shown in FIG. 2. The color filter portion 209 is divided into three parts at substantially equal angles: a blue-transmission dichroic filter 209a, a green-transmission dichroic filter 209b, and a red-transmission dichroic filter 209c. The color wheel 208 is supported by a motor 210 at the center of the ring-shaped color filter portion 209 and rotated at high speed.

The light from the light sources 202, 205 passes through the color filter portion 209 and is collimated into substantially parallel light by passing through condenser lenses 211, 212. Then, the light passes through a filter 213 for rejecting ultraviolet and infrared rays and enters an integrated optical system 214.

The integrated optical system 214 includes a first lens array 215, a second lens array 216, and a condenser lens 217. The first lens array 215 is provided with many microlenses 219 arranged on the same plane. Each microlens 219 has an aperture that is similar in shape to the effective portion of a reflection-type liquid crystal panel 218, which will be described later. Similarly, the second lens array 216 is provided with many microlenses 220 arranged closely together on the same plane. The microlenses 220 of the second lens array 216 are arranged at the positions where secondary images of the light source are formed by each microlens 219 of the first lens array 215. Each microlens 220 magnifies the aperture shape of the corresponding microlens 219 of the first lens array 215 and projects it onto the reflection-type liquid crystal panel 218. As a result, the images of the microlenses 219 of the first lens array 215 are superimposed to illuminate the reflection-type liquid crystal panel 218 uniformly.

Figure 6:
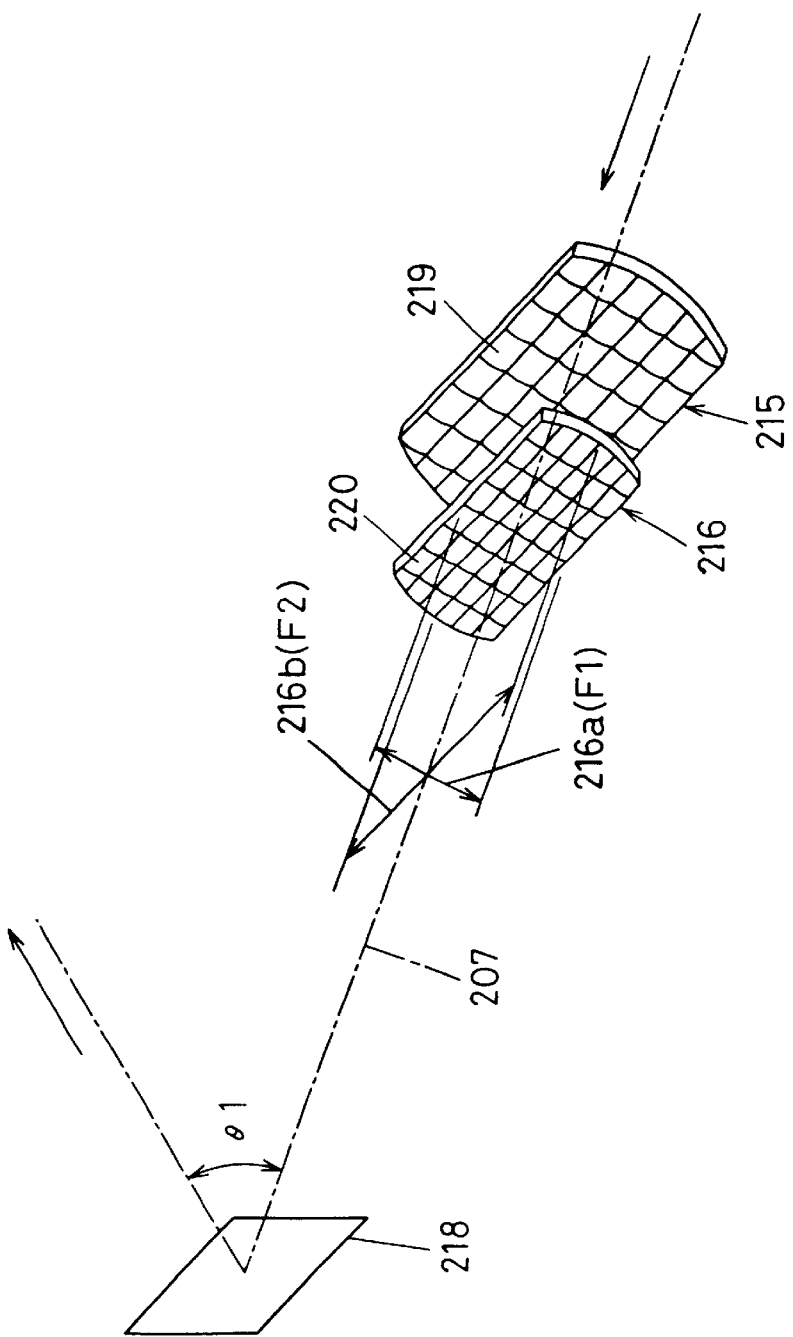
FIG. 6 is a perspective view showing a part of an optical system of a projection display system of Embodiment I-2 of the present first invention.
Figure 7:
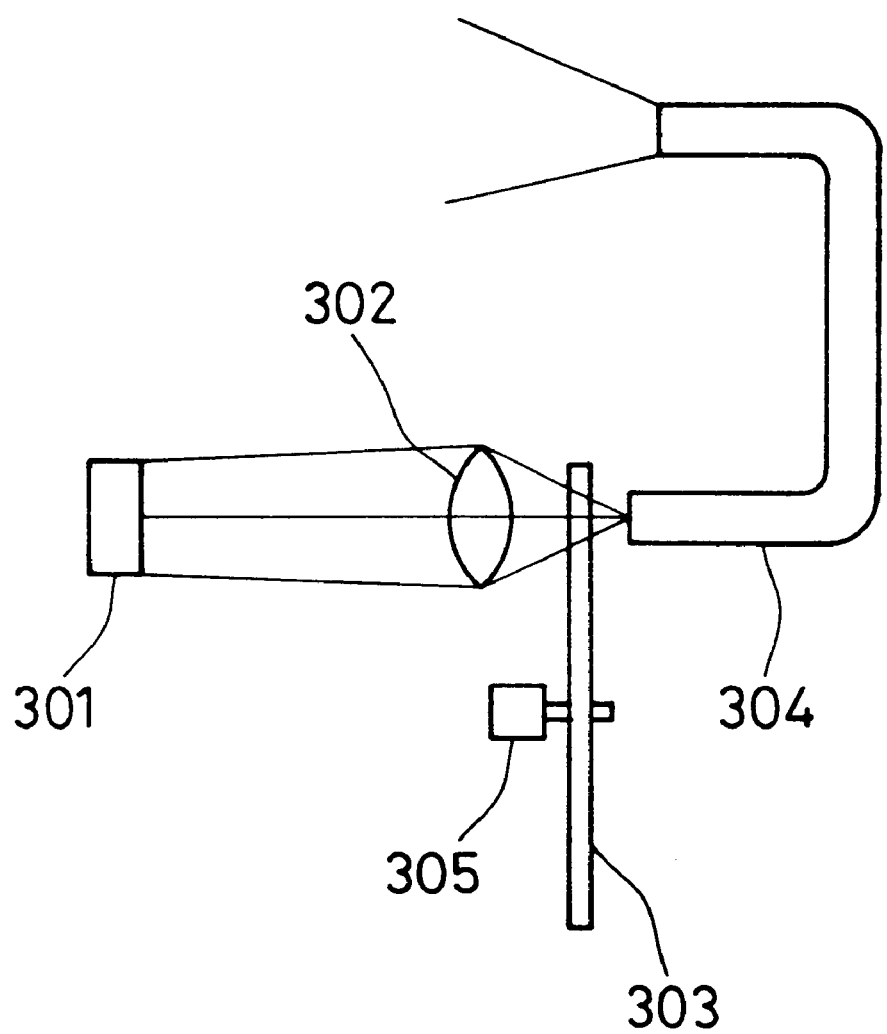
FIG. 7 shows a configuration of a conventional lighting optical system using a rotating color wheel.
Figure 8:
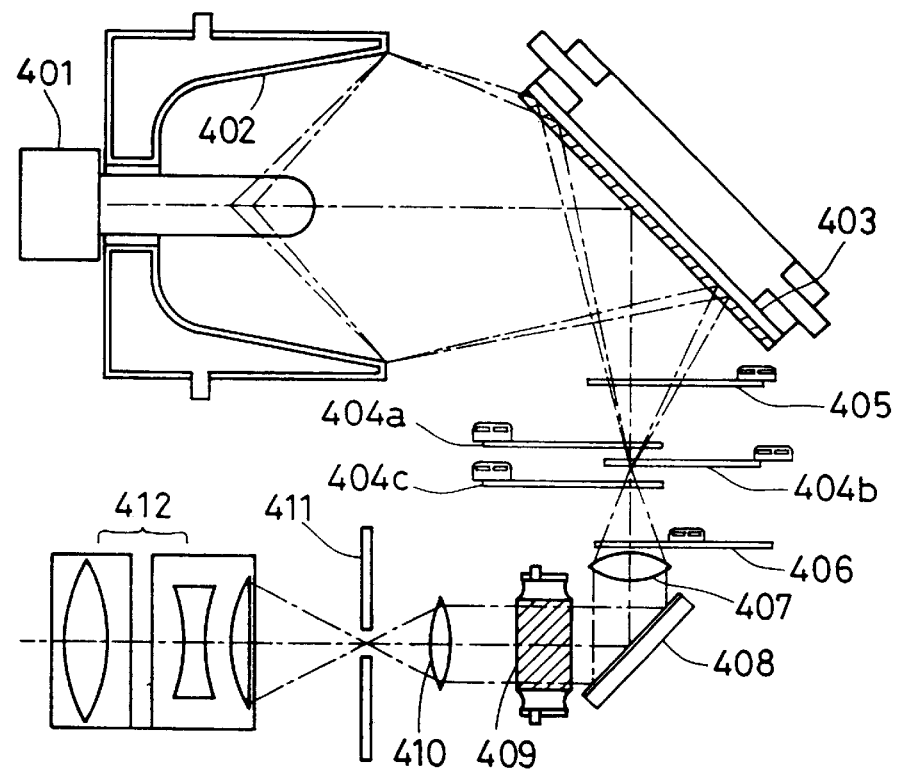
FIG. 8 shows a configuration of a conventional projection display system using a single-plate light valve operated by time-division driving.

FIG. 6 is a perspective view showing the arrangement of the first lens array 215, the second lens array 216, and the reflection-type liquid crystal panel 218. In FIG. 6, the arrow along the system axis 207 indicates the traveling direction of the light from the light sources. Unlike Embodiment I-1, many microlenses 220 are arranged closely together so that the external shape of the second lens array 216 when viewed from the reflection-type liquid crystal panel 218 is limited in one direction (the direction 216a), as shown in FIG. 6. Specifically, the external shape of the second lens array 216 is such that the size in the direction 216a is smaller than that in the direction 216b, which is perpendicular to the direction 216a. The direction 216a, in which the height of the second lens array 216 is limited, is parallel to a plane containing the axes of the light incident on and reflected from the effective portion of the reflection-type liquid crystal panel 218, which will be described later. In other words, the direction 216a is included in that plane. Also, each microlens 219 of the first lens array 215 is set so as to form the secondary image of the light source on the corresponding microlens 220 of the second lens array 216.

The light through the integrated optical system 214 enters a polarizer 221, where the polarized component of the light parallel to the light-absorption axis of the polarizer 221 is absorbed, so that only light having the polarized component perpendicular to that axis is transmitted and enters the reflection-type liquid crystal panel 218.

The reflection-type liquid crystal panel 218 is composed of many pixels that can modulate light individually in response to the input signals from the outside. Among the light incident on the reflection-type liquid crystal panel 218, the polarization direction of the light entering a pixel to display black on a screen is changed by 90 degrees when the light reflects off the reflection-type liquid crystal panel 218. Thus, the light is absorbed by an analyzer 222. On the other hand, the polarization direction of the light entering a pixel to display white on a screen is unchanged when the light reflects off the reflection-type liquid crystal panel 218. Thus, the light is transmitted through the analyzer 222. Here, the angle between the axes of the light incident on and reflected from the reflection-type liquid crystal panel 218 is θ1.

The light through the analyzer 222 enters a projection lens 223, which is a projection optical system. As a result, an image on the reflection-type liquid crystal panel 218 is magnified and projected onto a screen 224. At this time, the optical axis of the light reflected from the reflection-type liquid crystal panel 218 and the optical axis 223a of the projection lens 223 are shifted, as shown in FIG. 4. Therefore, the light emitted from the projection lens 223 is projected onto the screen to form a magnified image on the side opposed to the reflection-type liquid crystal panel 218 with respect to the optical axis 223a of the projection lens 223 (i.e., the axis-shifting projection).

Here, as shown in FIG. 6, the shape of the second lens array 216 is set so as to satisfy F1>F2, where, among a lighting F number relative to the reflection-type liquid crystal panel 218, F1 represents the lighting F number in the direction parallel to a plane (the direction 216a) containing the axes of the light incident on and reflected from the effective portion of the reflection-type liquid crystal panel 218; F2 represents the lighting F number in the direction 216b perpendicular to that plane. Furthermore, the following relationship is established:

$F1 > 1/(2 \sin(\theta1/2))$ $F2 < 1/(2 \sin(\theta1/2))$ where θ1 represents the angle between the light incident on the reflection-type liquid crystal panel 218 and the light reflected from the reflection-type liquid crystal panel 218 into the projection lens 223.

In this embodiment, it should go without saying that the driving timing for video signals is synchronized with the color of the light passing through the color wheel 208. Those video signals are input to the reflection-type liquid crystal panel 218, corresponding to the RGB colors.

Like Embodiment I-1, with a conventional configuration merely employing two light sources (e.g., JP 6-242397 A and JP 6-265887 A), images of the light sources are large. However, the present embodiment can minimize the size of the images of the light sources by optimizing the arrangement of two light sources and superimposing two light source images formed on the rotating color wheel 208 or its vicinity. Thus, the rotating color wheel 208 can have the smallest diameter. This can provide high-brightness projection images because of an twofold increase in the light from the light sources, while reducing the size of the set, the cost, and noise during rotation, increasing reliability during rotation, and preventing color mixture.

In the above embodiment, the light from the light sources 202, 205 is condensed by the elliptical mirrors 203, 206. However, the present invention is not limited thereto. For example, the same object can be attained with the following configuration: parabolic mirrors are used instead of the elliptical mirrors 203, 206; the light sources are placed at the focal positions of the parabolic mirrors, from which light is emitted as parallel light and condensed by a convex lens or the like.

In the above embodiment, the integrated optical system is used. However, when restrictions on the cost or the like have priority over image quality, such an optical system is not necessarily needed, and the optical system may consist of, e.g., a condenser lens.

In the above embodiment, the reflection-type liquid crystal panel 218 is used as a light valve. However, the present invention is not limited thereto. It should go without saying that other configurations may be employed as long as the display system can modulate the input light in response to signals from the outside.

Furthermore, instead of the reflection-type liquid crystal panel 218 that controls the polarization directions of the incident light for each pixel and reflects it, a small mirror array device also can be used, which is described in SID (ASIA DISPLAY '95), pp. 95–98. The small mirror array device is provided with many rows of reflecting surfaces corresponding to each pixel. By controlling the reflecting surfaces to change the inclination individually, the traveling direction of the reflected light can be changed. In this case, the above description can be applied to the small mirror array device by replacing θ1, the angle between the light incident on and reflected from the reflection-type liquid crystal panel 218 shown in FIGS. 4 and 6, with the angle between the light entering the projection optical system 223 to form a projection image among the reflected light and the incident light.

Also, it is obvious to those skilled in the art that the same idea can be applied to the configuration, in which, though lighting efficiency is somewhat reduced, the integrated optical system is composed of a condenser lens and a special aperture stop; the special aperture stop has an aperture equal to the external shape of the second lens array 216 described above.

In Embodiment I-2, the angle of incidence of the light entering the color wheel 208 is larger than that in the system using a single light source. When an increase in the angle of incidence causes problems in practical use, the ends of the openings of the elliptical mirrors 203, 206, acting as reflectors of the light sources, may be cut away on the side where two mirrors are adjacent. Thus, the light sources 202, 205 are close together, so that the angle of incidence can be reduced.

The problem of red light can be improved by placing a bandpass filter near the filter 213 for rejecting ultraviolet and infrared rays of this embodiment. The bandpass filter rejects only the yellow component.

As described above, this embodiment provides a projection display system including: the light sources 202, 205; condensers (the elliptical mirrors 203, 206) for condensing the light from the light sources; a time-division color separating optical system (the color wheel 208) for temporally switching the incident light to a first, second, or third color of light to be emitted; a light valve (the reflection-type liquid crystal panel 218) capable of modulating the incident light individually for each pixel; a lighting optical system (the condenser lenses 211, 212 and the integrated optical system 214) for directing the light from the time-division color separating optical system onto the light valve, and a projection optical system (the projection lens 223) for magnifying and projecting a pixel on the light valve. In such a projection display system, the number of the light sources and the condensers is two, respectively. The light from each of the light sources is condensed on the time-division color separating optical system or its vicinity by the condensers. Both condensing positions are superimposed. In addition, the two condensers are close together optically. This can provide a projection display system that enables high brightness, low cost, and miniaturization.

Here, it is most preferable that the position, at which the images of the light sources condensed respectively by the two condensers are superimposed, is on the time-division color separating optical system (the color wheel 208). However, the position of the superimposition can be shifted somewhat in the direction of the optical axis (the system axis 207) when it can be permissible in terms of the size of the color wheel or that of the light source images.

In the case where the two elliptical mirrors 203, 206 that act as condensers cannot be close together as shown in FIG. 5 because of the restrictions on structure and reliability, a general optical means may be employed to ensure the structural distance between the elliptical mirrors 203 and 206. Such an optical means includes placing a reflecting mirror on the incident side of the time-division color separating optical system (the color wheel 208), placing an optical path changing prism, and the like. At the same time, this makes it possible to optically minimize the ineffective area of light between the two condensers, when viewed from the time-division color separating optical system (the color wheel 208).

Furthermore, in Embodiment I-2, the plane containing the system axis 207, the optical axis 201 of the first lamp, and the optical axis 204 of the second lamp is parallel to the vertical direction; of course, it may be parallel to the horizontal direction.

Second Invention

Embodiment II-1

Figure 9:
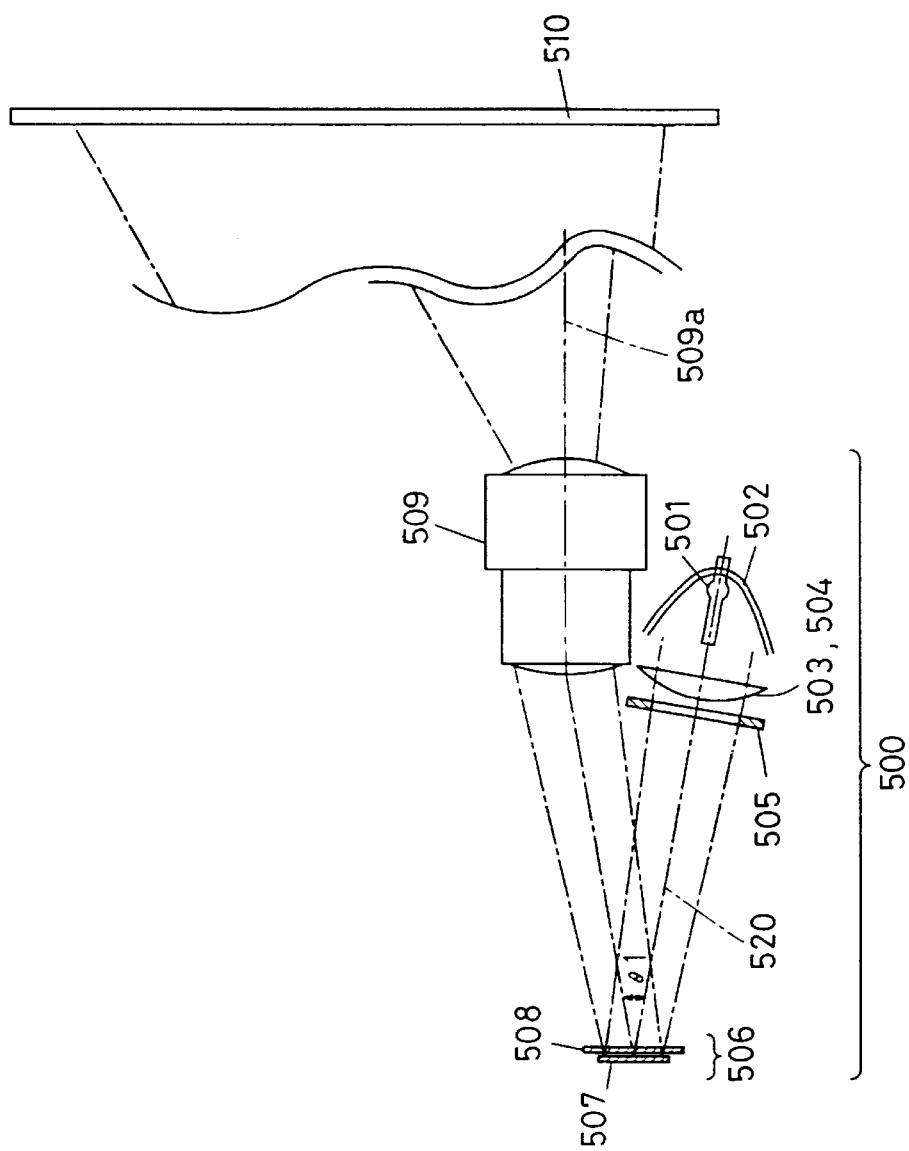
FIG. 9 shows a schematic configuration of a projection display system of Embodiment II-1 of the present second invention.
Figure 10:
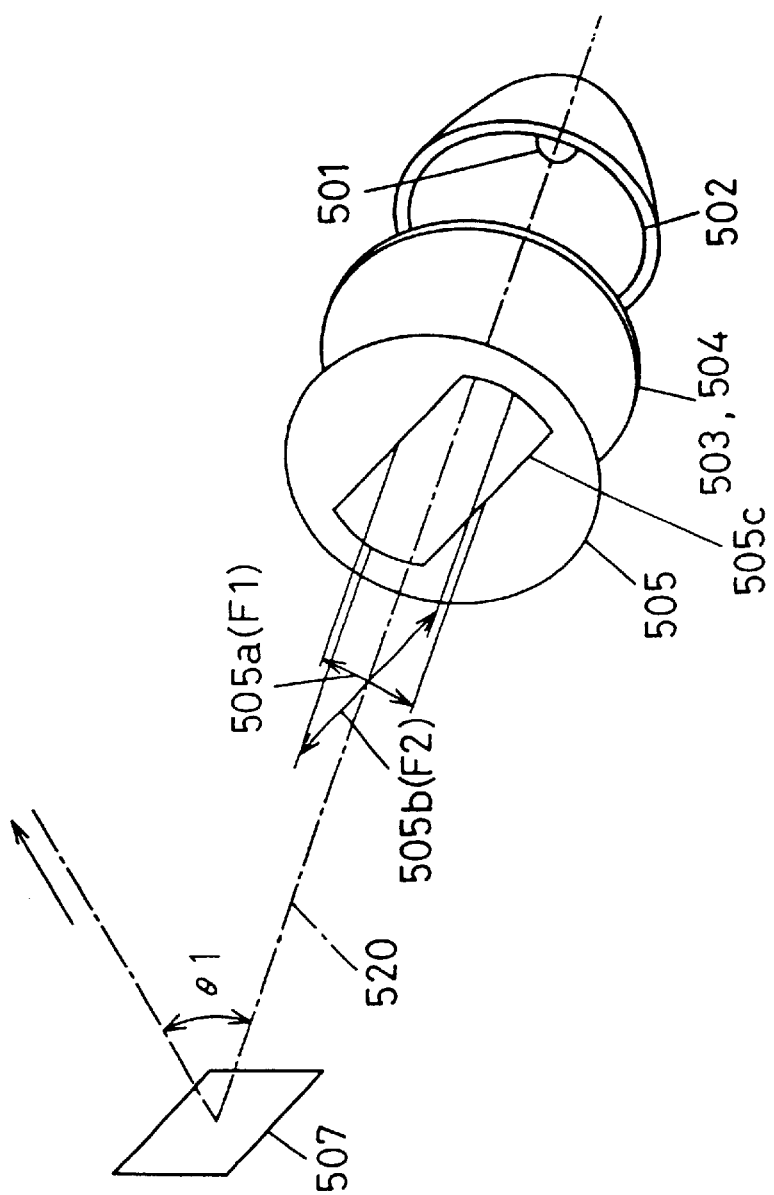
FIG. 10 is a perspective view showing a part of an optical system of a projection display system of Embodiment II-1 of the present second invention.

FIG. 9 shows a schematic configuration of a projection display system of Embodiment II-1. FIG. 10 is a perspective view showing a part of an optical system of a projection display system of Embodiment II-1.

In a projection display system 500 of this embodiment, the light from a light source 501 is emitted by a reflector 502 along a system axis 520. Then, the light enters a condenser lens 504 that constitutes a lighting optical system 503. The light through the condenser lens 504 passes through a special aperture stop 505, and diagonally enters a panel unit 506 at the angle of incidence of θ1/2, as shown in FIG. 9.

The panel unit 506 includes a reflection-type liquid crystal panel 507 and a polarizing plate 508. The reflection-type liquid crystal panel 507 is composed of many pixels that can modulate light individually in response to the input signals from the outside. The polarizing plate 508 is provided in proximity to the reflection-type liquid crystal panel 507 on its incident side and acts as a polarizer as well as an analyzer. Natural light enters the panel unit 506, where the polarized component of the light parallel to the light-absorption axis of the polarizing plate 508 is absorbed, so that only light having the polarized component perpendicular to that axis is transmitted and enters the reflection-type liquid crystal panel 507. Among the light entering here, the polarization direction of the light entering a pixel to display black on a screen is changed by 90 degrees when the light reflects off the reflection-type liquid crystal panel 507. Thus, the light is absorbed by the polarizing plate 508, which acts as an analyzer. On the other hand, the polarization direction of the light entering a pixel to display white on a screen is unchanged when the light reflects off the reflection-type liquid crystal panel 507. Thus, the light is transmitted through the polarizing plate 508, which acts as an analyzer. Here, the angle between the light incident on the reflection-type liquid crystal panel 507 and the light reflected from the reflection-type liquid crystal panel 507 through the polarizing plate 508 is θ1.

The light reflected from the reflection-type liquid crystal panel 507 passes through the polarizing plate 508 and enters a projection lens 509, which is a projection optical system. As a result, an image on the reflection-type liquid crystal panel 507 is magnified and projected onto a screen 510. At this time, the optical axis of the light reflected from the reflection-type liquid crystal panel 507 and the optical axis 509a of the projection lens 509 are shifted, as shown in FIG. 9. Therefore, the light emitted from the projection lens 509 is projected onto the screen to form a magnified image on the side opposed to the reflection-type liquid crystal panel 507 with respect to the optical axis 509a of the projection lens 509 (i.e., the axis-shifting projection).

Here, as shown in FIG. 10, the shape of an aperture 505c in the special aperture stop 505 is set so as to satisfy F1>F2, where, among a lighting F number relative to the reflection-type liquid crystal panel 507, F1 represents the lighting F number in the direction parallel to a plane (the direction 505a) containing the axes of the light incident on and reflected from the effective portion of the reflection-type liquid crystal panel 507; F2 represents the lighting F number in the direction 505b perpendicular to that plane. Furthermore, the following relationship is established:

$$F1 > 1/(2\sin(\theta 1/2))$$

$$F2 < 1/(2\sin(\theta 1/2))$$

where θ1 represents the angle between the light incident on the reflection-type liquid crystal panel 507 and the light reflected from the reflection-type liquid crystal panel 507 into the projection lens 509.

This configuration provides a simple structure without using a PBS, thereby increasing the degree of freedom in a light source setting. Thus, high efficiency and high brightness can be achieved.

F1 is determined by the following factors: the interference between the lighting optical system and the projection optical system; poor contrast caused by an increase in the angle of incidence of the light entering the reflection-type liquid crystal panel 507, and the limitation on the amount of axis-shifting required for the position of projection.

On the other hand, F2 is determined by the F number of the projection optical system.

When F1=1/(2 sin(θ1/2)), the smallest parts of the light incident on and reflected from the reflection-type liquid crystal panel 507 are superimposed. Thus, F1>1/(2 sin(θ1/2)) has to be established.

In a conventional configuration, the lighting F number in the direction parallel to a plane containing the axes of the light incident on and reflected from the effective portion of the reflection-type liquid crystal panel 507 is the same as the lighting F number in the direction perpendicular to that plane, i.e., both are represented by F1. In other words, an aperture in a stop is circular, having a diameter equal to an aperture width of the aperture stop 505 of this embodiment in the 505a direction. Moreover, there is the lowest limit to F1, as described above. For these reasons, it is impossible to reduce the lightning F number and improve the condensing efficiency.

On the other hand, in this embodiment, the use of the special aperture stop 505 increases the angle of divergence of the light entering the effective portion of the reflection-type liquid crystal panel 507 in the direction 505b, i.e., F1>F2 is achieved. In other words, F2<1/(2 sin(θ1/2)) is established.

Figure 11:
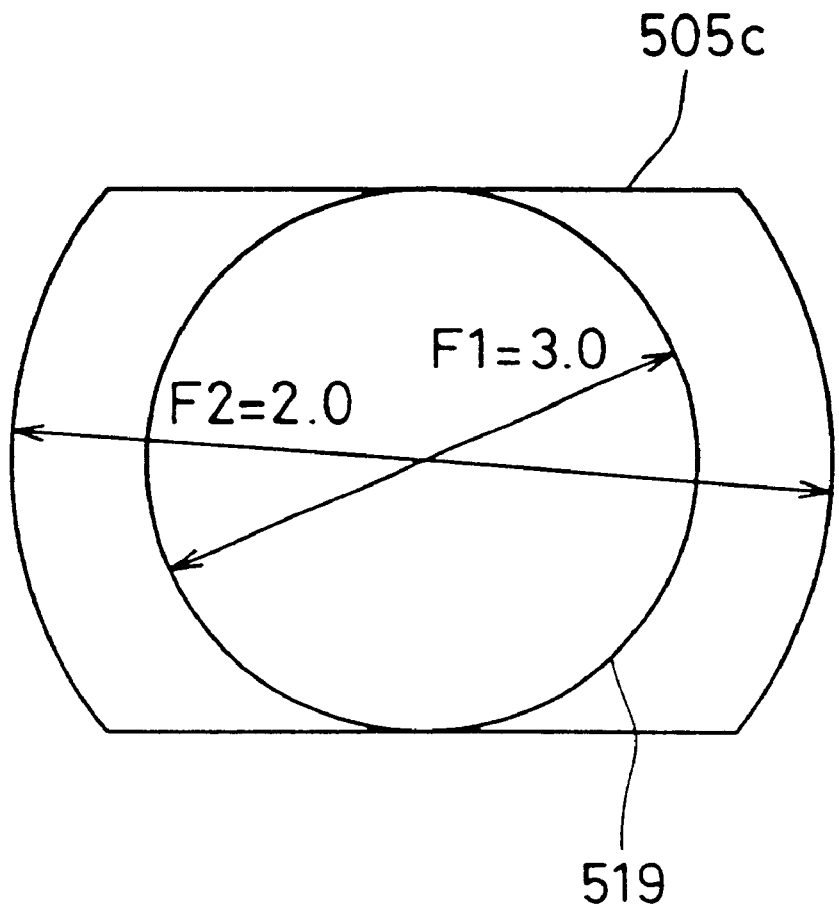
FIG. 11 is a view to assist in explaining the effect of a special aperture stop of Embodiment II-1.

Here, the extent of improvement of brightness according to this embodiment is calculated by showing the specific values. For example, when θ1=20 degrees, F1>2.88 and F2<2.88 are given by the above two inequalities. Therefore, as shown in FIG. 11, in the case where the special aperture stop 405 having, e.g., F1=3 and F2=2 is used, this embodiment can provide brightness that is about 1.8 times that of a conventional configuration including a circular aperture stop of F1=3, assuming that the distribution of the light from the condenser lens 504 is uniform. In FIG. 11, the reference numeral 505c indicates the aperture shape of the special aperture stop 505 of this embodiment; the reference numeral 519 indicates the aperture shape of a conventional circular aperture stop.

Figure 12:
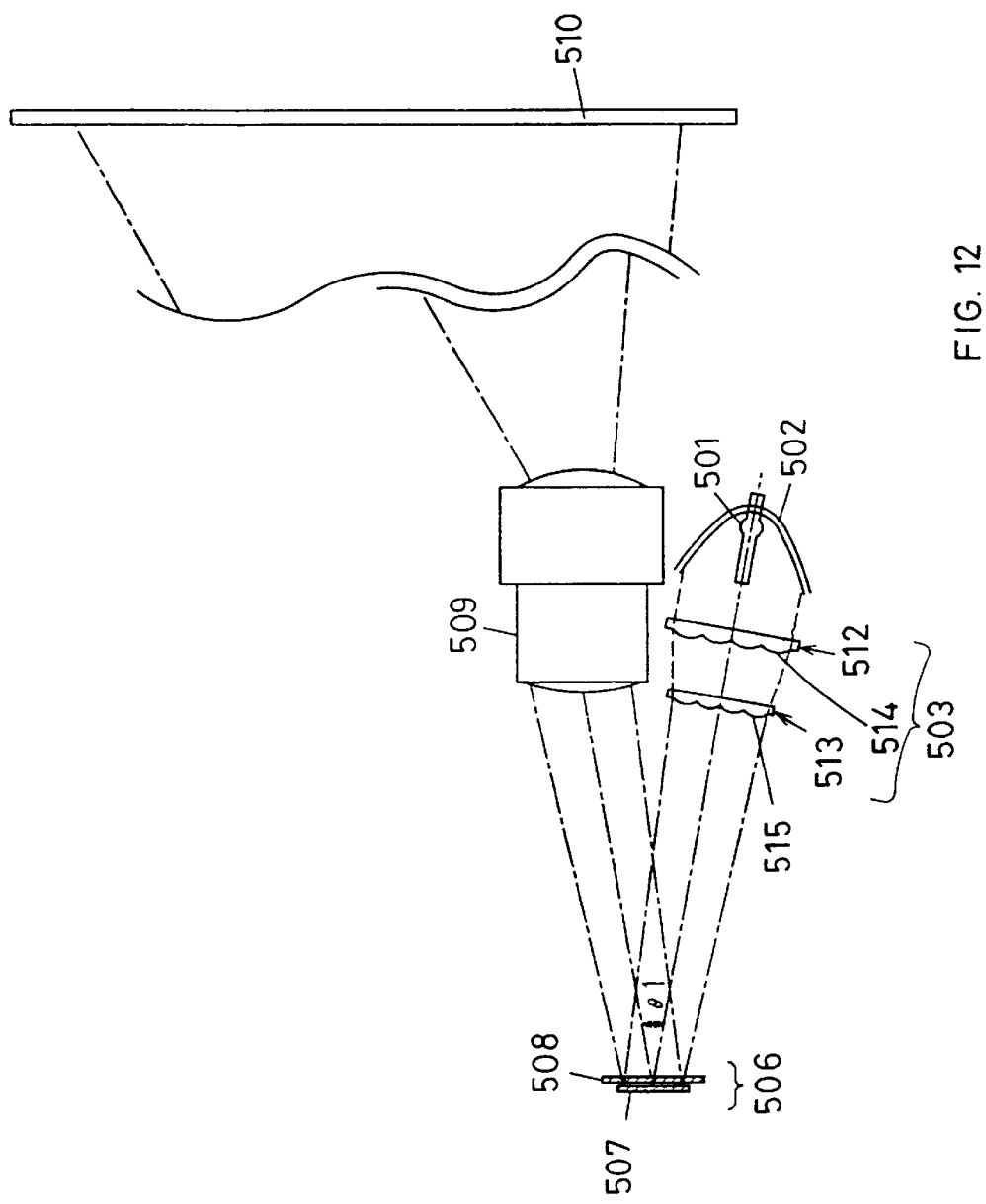
FIG. 12 shows a schematic configuration of a projection display system of Embodiment II-1, when an integrated optical system is used in a lighting optical system.

In the above description, the lighting optical system 503 is composed of the condenser lens 504. However, the present invention is not limited thereto. For example, the lighting optical system 503 may be composed of an integrated optical system including a first lens array 512 and a second lens array 513, as shown in FIG. 12.

The first lens array 512 is provided with many microlenses 514 arranged on the same plane. Each microlens 514 has an aperture that is similar in shape to the effective portion of the reflection-type liquid crystal panel 507. Similarly, the second lens array 513 is provided with many microlenses 515 arranged closely together on the same plane. The microlenses 515 of the second lens array 513 are arranged at the positions where the secondary images of the light source are formed by each microlens 514 of the first lens array 512. Each microlens 515 magnifies the aperture shape of the corresponding microlens 514 of the first lens array 512 and projects it onto the reflection-type liquid crystal panel 507. As a result, the images of the microlenses 514 of the first lens array 512 are superimposed to illuminate the reflection-type liquid crystal panel 507 uniformly.

Figure 13:
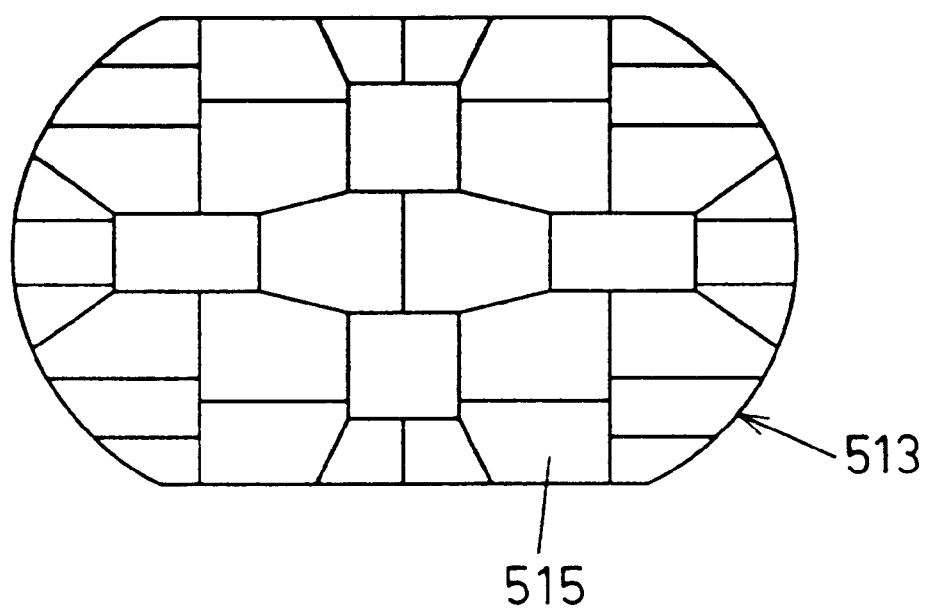
FIG. 13 is an external view showing a second lens array of Embodiment II-1.

Here, as shown in FIG. 13, many microlenses 515 are arranged closely together so that the external shape of the second lens array 513 when viewed from the reflection-type liquid crystal panel 507 is limited in one direction (the vertical direction of the sheet of the drawing). Specifically, the external shape of the second lens array 513 is such that the size in the vertical direction of the drawing sheet is smaller than that in the lateral direction thereof. The direction (the vertical direction of the drawing sheet), in which the height of the second lens array 513 is limited, is parallel to a plane containing the axes of the light incident on and reflected from the effective portion of the reflection-type liquid crystal panel 507. In other words, the vertical direction of FIG. 13 is included in that plane. Also, each microlens 514 of the first lens array 512 is set so as to form the secondary image of the light source on the corresponding microlens 515 of the second lens array 513. In this case, the lighting F numbers are set in the same manner as for the special aperture stop 505.

When the special aperture stop 505 described above is used, a part of the light from the light source 501 is blocked by the stop, so that all the light is not used effectively to project an image. However, the use of the optimized integrated optical system in this embodiment makes it possible to set the shape of the emission portion of the lighting optical system without causing losses. Thus, a system with high light utilization efficiency can be provided.

Figure 14:
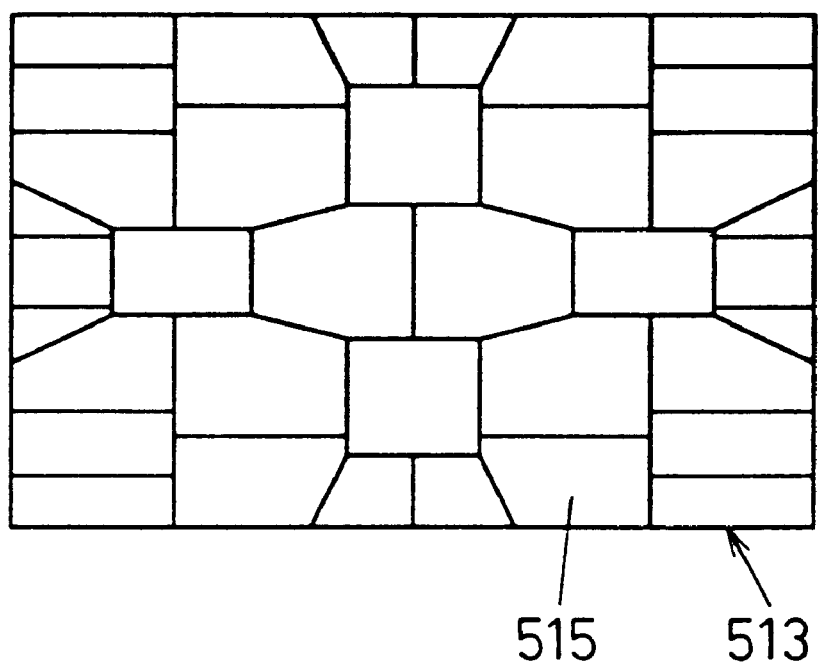
FIG. 14 is an external view showing another example of a second lens array of Embodiment II-1.
Figure 15:
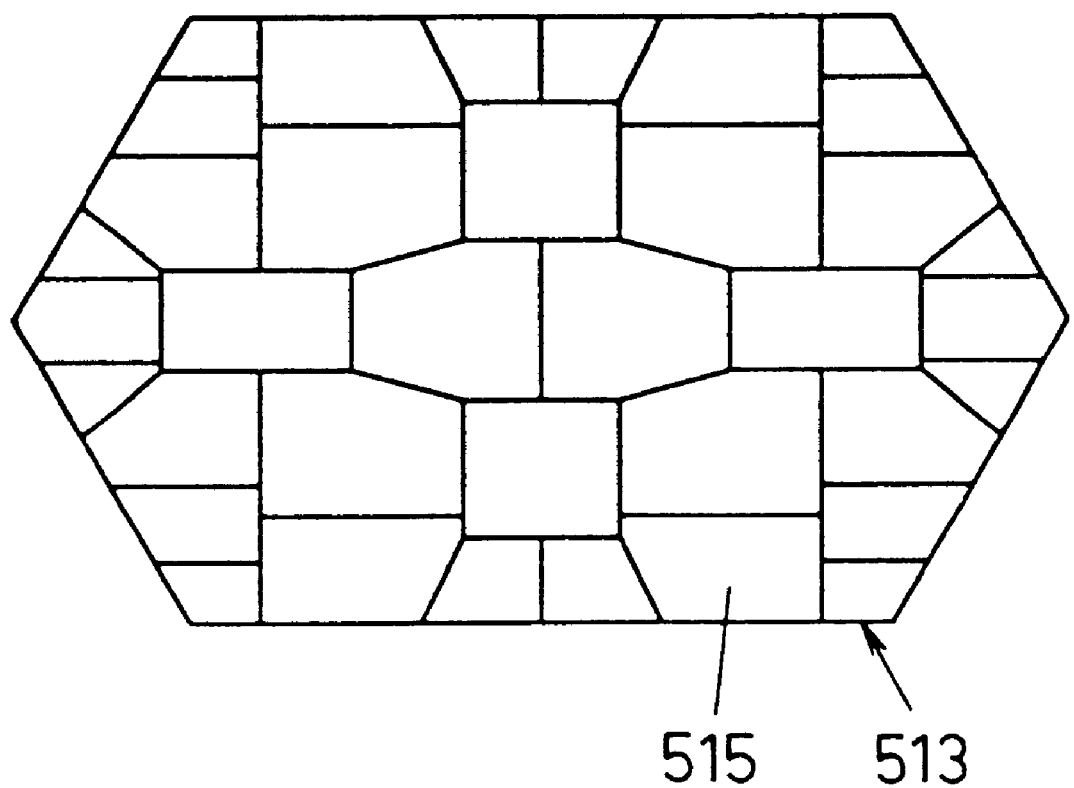
FIG. 15 is an external view showing yet another example of a second lens array of Embodiment II-1.
Figure 16:
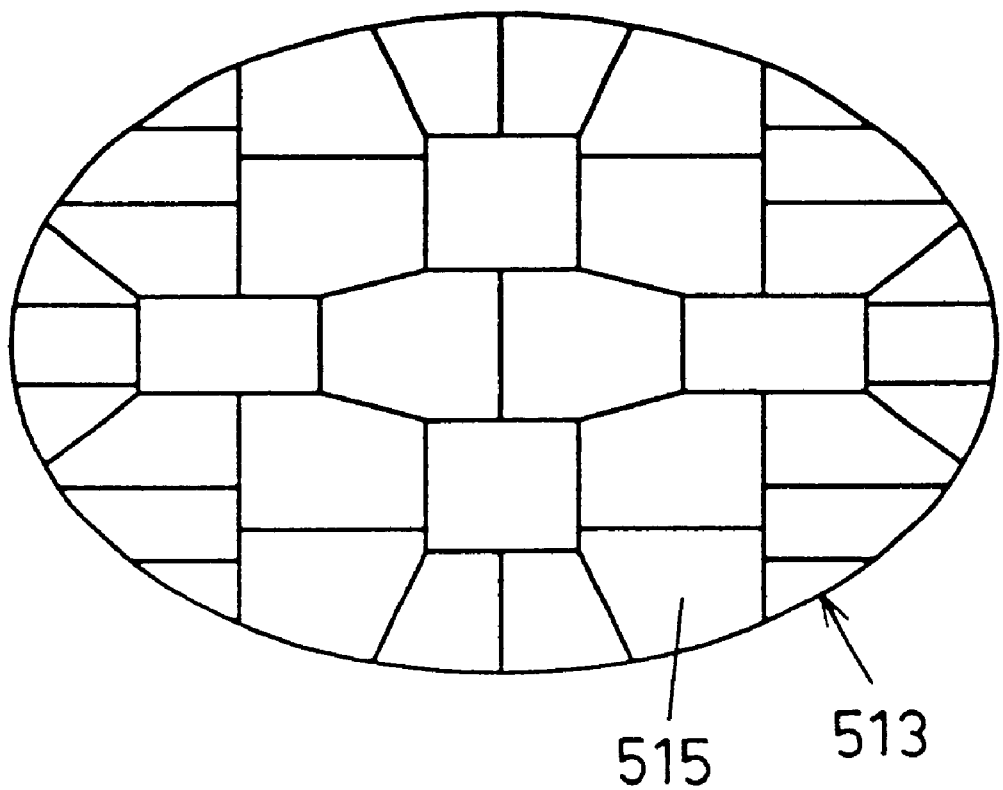
FIG. 16 is an external view showing yet another example of a second lens array of Embodiment II-1.

In FIG. 13, the second lens array 513 has a substantially oval shape. However, the external shape of the second lens array 513 is not limited thereto. For example, it can be rectangular as shown in FIG. 14, hexagonal as shown in FIG. 15, elliptical as shown in FIG. 16, or the like.

In the above panel unit 506, in the case where the incident light is reflected without changing in its polarization direction, a white portion is displayed on a screen. However, other panels can be applied to this embodiment, in which the polarization direction of the incident light is changed by 90 degrees when the light is reflected, and thus a white portion is displayed on a screen. In this case, it is obvious that a polarizer and analyzer are composed preferably of separate polarizing plates, each having an axis extending in different directions; it should go without saying that the present invention can be also applied to this.

Embodiment II-2

Figure 17:
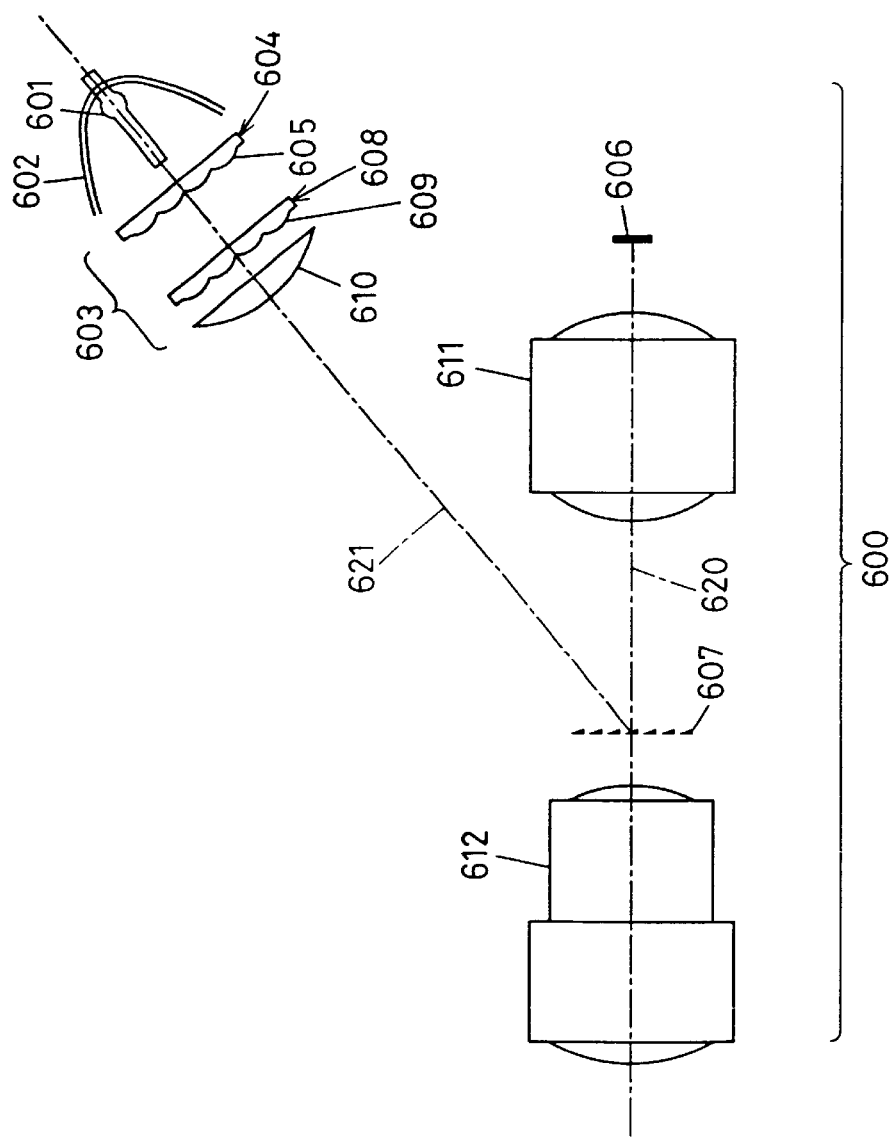
FIG. 17 shows a schematic configuration of a projection display system of Embodiment II-2 of the present second invention.

FIG. 17 shows a schematic configuration of a projection display system of Embodiment II-2. In a projection display system 600 of this embodiment, the light from a light source 601 is emitted by a reflector 602 along a subsystem axis 621. Then, the light enters a lighting optical system 603. The lighting optical system 603 is composed of an integrated optical system including a first lens array 604 and a second lens array 608. The first lens array 604 is provided with many microlenses 605 arranged on the same plane. Each microlens 605 has an aperture that is similar in shape to the effective portion of a reflection-type light valve 606, which will be described later. In addition, the aperture shape of the microlens 605 is designed so that the angle between the subsystem axis 621 and a system axis 620 is taken into account to illuminate schlieren bars 607, which will be described later. Also, the second lens array 608 is provided with many microlenses 609 arranged closely together on the same plane. The microlenses 609 of the second lens array 608 are arranged at the positions where secondary images of the light source are formed by each microlens 605 of the first lens array 604.

Each microlens 609 magnifies the aperture shape of the corresponding microlens 605 of the first lens array 604 through a condenser lens 610 and projects it onto the position of the schlieren bars 607. In other words, the light from the light source 601 is once divided by the first lens array 604, and then superimposed at the position of the schlieren bars 607, where a third image of the light source is formed.

The light incident on the schlieren bars 607 is reflected therefrom, then enters a schlieren lens 611, and is focused to form an image on the reflection-type light valve 606 again.

The effective display area in the reflection-type light valve 606 is provided with many reflecting surfaces (not shown) formed closely together. The inclination angle of the respective reflecting surfaces can be controlled individually for each pixel. Since the reflecting surface of a pixel to display black on a screen is not inclined, the light incident perpendicularly on this surface is reflected therefrom, retraces the same optical path, and forms an image on the schlieren bars 607 again. Then, the light is reflected from the schlieren bars toward the subsystem axis 621 and returns to the light source. Thus, the light beam does not reach a projection lens 612, which is a projection optical system, resulting in a black portion in the projection image. On the other hand, since the reflecting surface of a pixel to display white on a screen is inclined at an angle of θ, the light incident on this surface is reflected at an angle of 2θ with respect to the system axis 620 and forms an image at the position of the schlieren bars 607 again, like the above. However, since the reflected light is inclined with respect to the system axis 620, it does not form an image on the schlieren bars 607 and passes between the bars. The light thus transmitted through the schlieren bars 607 enters the projection lens 612 and is projected onto a screen (not shown). In such a manner, the effective display portion of the reflection-type light valve 606 is projected to form a magnified image on a screen.

In the above configuration, an F number of the schlieren lens 611 on the side of the schlieren bars 607 has to be large enough to cover the angle of convergence required for illuminating the schlieren bars 607 with the light from the light source 601 by the lighting optical system 603. In addition, to form an image on the schlieren bars 607 (more precisely, between the bars) again without causing light loss by focusing the light reflected from the reflecting surface in the reflection-type light valve 606, the surface being inclined at an angle of θ, it is necessary to reduce the F number on the side of the schlieren bars 607 by the amount corresponding to the inclination angle 2θ of the light emitted from the light valve 606.

Figure 18:
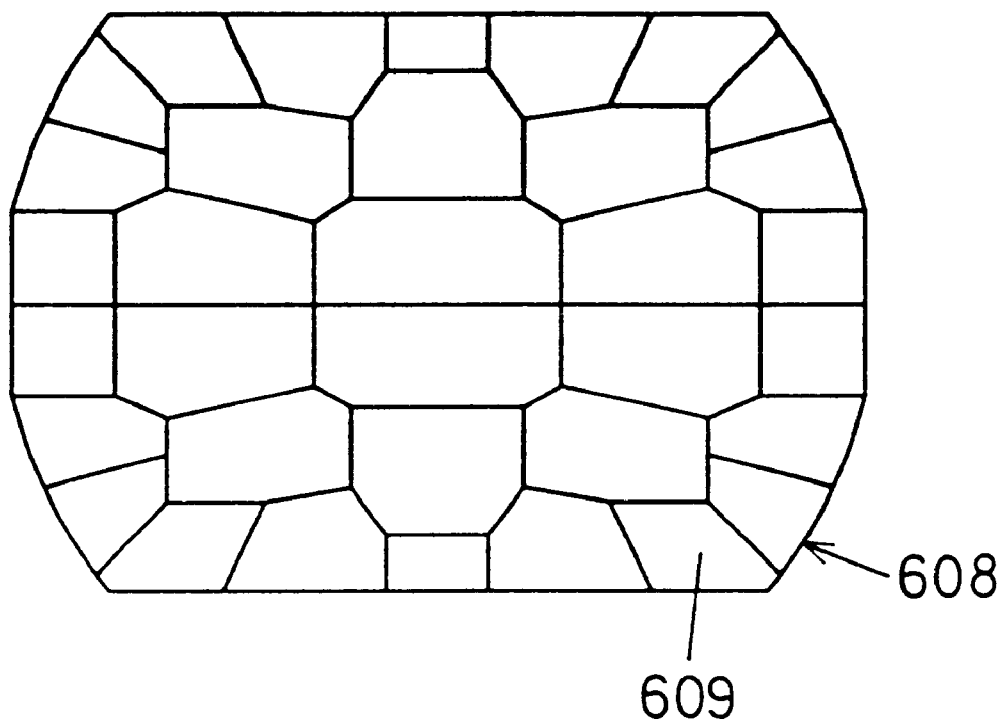
FIG. 18 is an external view showing a second lens array of Embodiment II-2.
Figure 19:
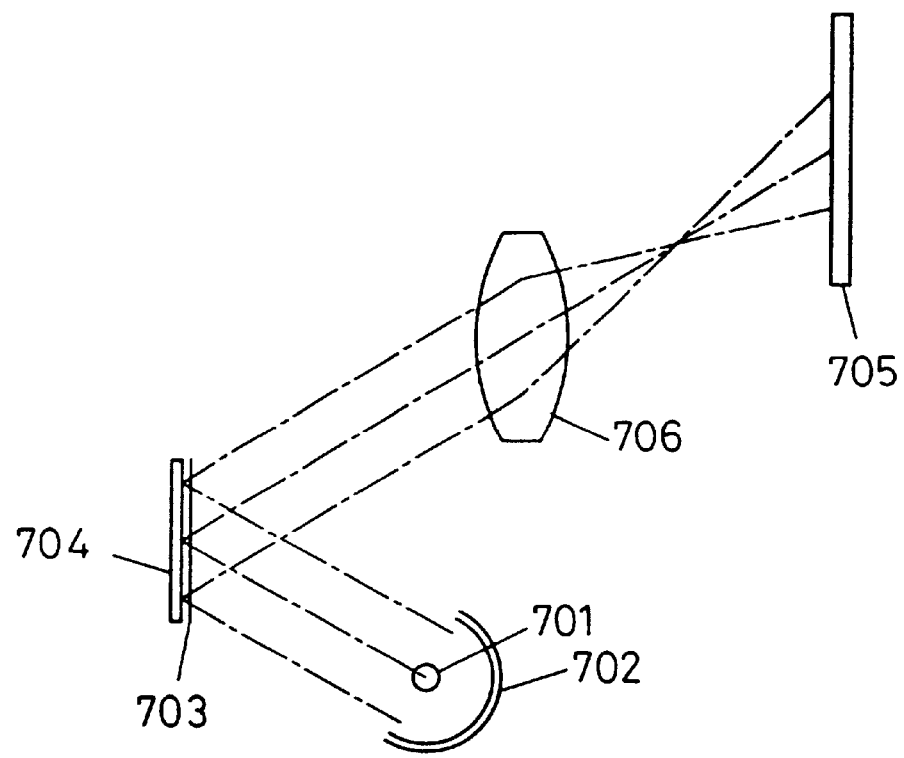
FIG. 19 shows a schematic configuration of a conventional projection display system using a reflection-type liquid crystal panel.
Figure 20:
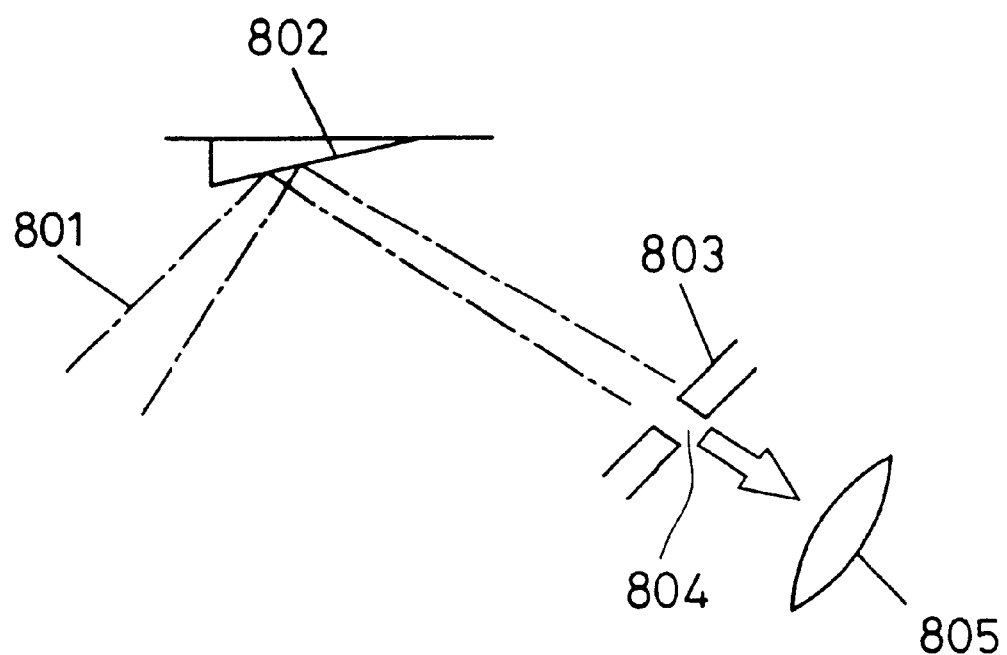
FIG. 20 shows a schematic configuration of a conventional projection display system using a reflection-type light valve.
Figure 21:
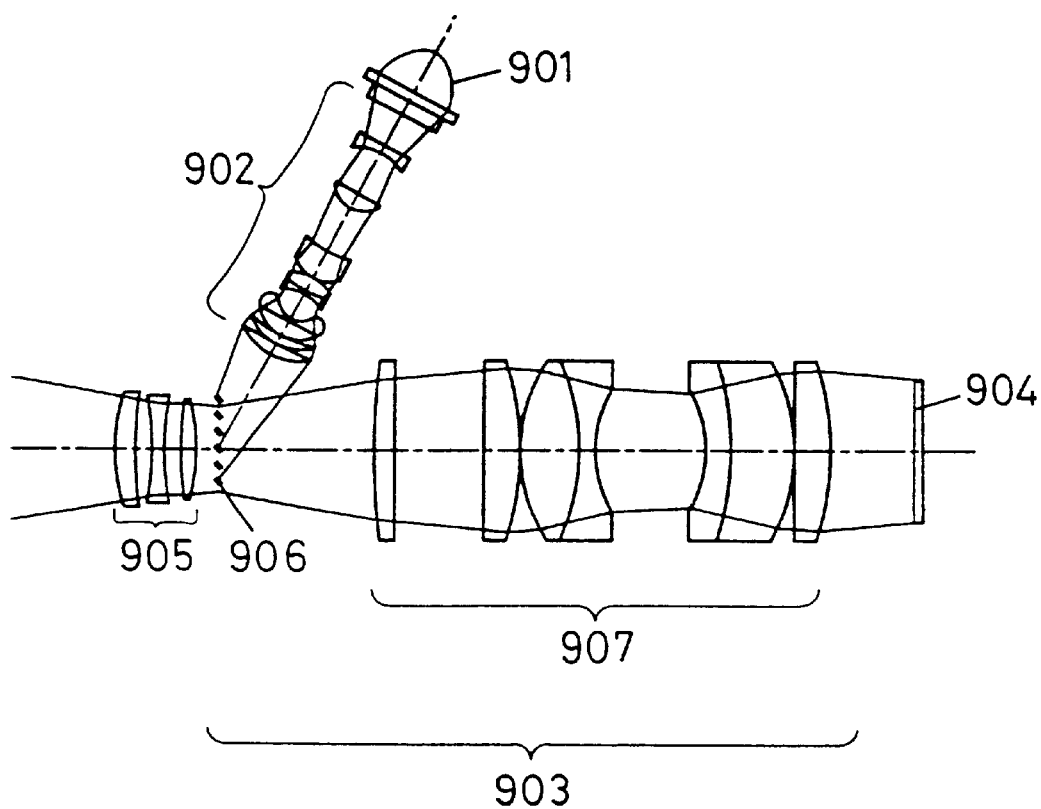
FIG. 21 shows a schematic configuration of another example of a conventional projection display system using a reflection-type light valve.

Thus, in this embodiment, many microlenses 609 are arranged closely together so that the external shape of the second lens array 608 when viewed from the subsystem axis 621 is limited in one direction (the vertical direction of the sheet of the drawing), as shown in FIG. 18. Specifically, the external shape of the second lens array 608 is such that the size in the vertical direction of the drawing sheet is smaller than that in the lateral direction thereof. Of course, it should go without saying that each microlens 605 of the first lens array 604 is set so as to form the secondary image of the light source on the corresponding microlens 609 of the second lens array. The direction (the vertical direction of the sheet of FIG. 18), in which the height of the second lens array 608 is limited, is parallel to a plane containing the subsystem axis 621 and the system axis 620. In other words, the direction is parallel to the plane containing the axis of the light incident on the reflection-type light valve 606 from the schlieren lens 611 and the axis of the light reflected from the reflection-type light valve 606.

Here, it is preferable that the following relationship is established substantially:

$$\sin^{-1}(F4/2)=\theta 2/2+\sin^{-1}(F3/2)$$

where, among a lighting F number relative to the schlieren bars 607, F3 represents the lighting F number in the direction parallel to a plane containing the axes of the light incident on and reflected from the reflection-type light valve 606; F4 represents the lighting F number in the direction perpendicular to that plane, and θ2 represents the angle between the light incident on the reflection-type light valve 606 and the light reflected from the reflection-type light valve 606 into the projection lens 612.

The above equation means that, in the schlieren lens 611, the lighting F number (the angle of divergence of light) in the direction parallel to the plane containing the axes of the light incident on and reflected from the reflection-type light valve 606 is the same as the lighting F number in the direction perpendicular to that plane. When this equation is satisfied, the schlieren lens 611 can have the minimum size to be required, even if a general lens with a circular pupil is used as the schlieren lens 611. Thus, the cost can be minimized.

Furthermore, since the second lens array 608 is formed generally by pressing or molding, the formation of the lens array into a shape that is asymmetrical with respect to the optical axis as described above does not increase the cost by a significant amount. Thus, the brightness performance can be maintained.

Also, it is obvious to those skilled in the art that the same idea can be applied to the configuration, in which, though lighting efficiency is somewhat reduced, the optical system 603 is composed of a condenser lens and a special aperture stop as described in Embodiment II-1.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection display system comprising:
    a light source;
    a condenser for condensing light from the light source;
    a time-division color separating optical system for temporally switching incident light to a plurality of different colors of light to be emitted;
    a light valve capable of modulating incident light individually for each pixel;
    a lighting optical system for directing light from the time-division color separating optical system onto the light valve, and
    a projection optical system for magnifying and projecting a pixel on the light valve,
    wherein the number of the light source and the condenser is at least two, respectively, the light sources emitting light simultaneously, light from the light sources being condensed on the time-division color separating optical system by the condensers, and both condensing positions are superimposed.

2. The projection display system according to claim 1, wherein the condenser includes an umbrella-type reflector provided with an elliptical reflecting surface.

3. The projection display system according to claim 1, wherein the condenser includes an umbrella-type reflector provided with a parabolic reflecting surface and optical components having a convex-lens effect.

4. The projection display system according to claim 1, wherein the lighting optical system includes a lens for collimating light from the time-division color separating optical system into substantially parallel light and an integrated optical system, and the integrated optical system includes a first lens array that divides incident light into separate rays of light to form secondary images of the light source and a second lens array provided with a plurality of microlenses arranged at the positions where the secondary images of the light source are formed.

5. The projection display system according to claim 1, wherein the light valve is a reflection-type light valve.

6. The projection display system according to claim 5, wherein a shape of an exit pupil formed in the lighting optical system, which can be taken as a light-emitting surface when the lighting optical system is viewed from the reflection-type light valve, is such that a size in a direction parallel to a plane containing axes of light incident on and reflected from the reflection-type light valve is smaller than that in a direction perpendicular to that plane, and the following relationship is established:

$$F1>1/(2\sin(\theta1/2))$$

$$F2<1/(2\sin(\theta1/2))$$

where, among a lighting F number relative to the reflection-type light valve, F1 represents the lighting F number in the direction parallel to the plane containing the axes of the light incident on and reflected from the reflection-type light valve, F2 represents the lighting F number in the direction perpendicular to that plane, and θ1 represents an angle between the light incident on the reflection-type light valve and the light reflected from the reflection-type light valve into the projection optical system.

7. The projection display system according to claim 5, wherein the reflection-type light valve can control polarization directions of incident light individually for each pixel, and a polarizer is provided on an optical axis on an incident side of the reflection-type light valve and an analyzer is provided on an optical axis on an exit side thereof.

8. The projection display system according to claim 5, wherein the reflection-type light valve is provided with reflecting surfaces whose inclination angle can be controlled individually for each pixel, and displays an image in such a manner that the inclination angle of the respective reflecting surfaces is controlled so as to change an emission angle of light, and thereby light to be incident on the projection optical system is selected.

9. The projection display system according to claim 5, wherein the lighting optical system includes a lens for collimating light from the time-division color separating optical system into substantially parallel light and an integrated optical system, the integrated optical system includes a first lens array that divides incident light into separate rays of light to form secondary images of the light source and a second lens array provided with a plurality of microlenses arranged at the positions where the secondary images of the light source are formed, and an entire shape of the second lens array is such that a size in a direction parallel to a plane containing axes of light incident on and reflected from the reflection-type light valve is smaller than that in a direction perpendicular to that plane.

10. The projection display system according to claim 5, wherein a plane containing a system axis and the two light sources is perpendicular to a plane containing axes of light incident on and reflected from the reflection-type light valve.

11. The projection display system according to claim 1, wherein the time-division color separating optical system is a rotating color wheel having a light selecting means that is placed on a circumference of a circle whose center is the center of rotation of the color wheel and separates incident white light into a plurality of different colors of light to be emitted.

12. A projection display system comprising:

a light source;

a lighting optical system for condensing light from the light source on a desired position;

a reflection-type light valve capable of modulating light from the lighting optical system individually for each pixel, and a projection optical system for magnifying and projecting a pixel on the reflection-type light valve, wherein a shape of an exit pupil formed in the lighting optical system, which can be taken as a light-emitting surface when the lighting optical system is viewed from the reflection-type light valve, is such that a size in a direction parallel to a plane containing axes of light incident on and reflected from the reflection-type light valve is smaller than that in a direction perpendicular to that plane, and the following relationship is established:

$$F1 > 1/(2 \sin(\theta 1/2))$$

$$F2 < 1/(2 \sin(\theta 1/2))$$

where, among a lighting F number relative to the reflection-type light valve, $F1$ represents the lighting F number in the direction parallel to the plane containing the axes of the light incident on and reflected from the reflection-type light valve, $F2$ represents the lighting F number in the direction perpendicular to that plane, and $\theta 1$ represents an angle between the light incident on the reflection-type light valve and the light reflected from the reflection-type light valve into the projection optical system.

13. The projection display system according to claim 12, wherein the reflection-type light valve can control polarization directions of incident light individually for each pixel, and a polarizer is provided on an optical axis on an incident side of the reflection-type light valve and an analyzer is provided on an optical axis on an exit side thereof.

14. The projection display system according to claim 12, wherein the reflection-type light valve is provided with reflecting surfaces whose inclination angle can be controlled individually for each pixel, and displays an image in such a manner that the inclination angle of the respective reflecting surfaces is controlled so as to change an emission angle of light, thereby light to be incident on the projection optical system is selected.

15. A projection display system comprising:

a light source;

a lighting optical system for condensing light from the light source on a desired position;

a reflection-type light valve provided with reflecting surfaces whose inclination angle can be controlled individually for each pixel and modulating light from the lighting optical system by controlling the inclination angle of the respective reflecting surfaces, and a projection optical system for magnifying and projecting a pixel on the reflection-type light valve, wherein a schlieren optical system including schlieren bars and a schlieren lens is arranged between the lighting optical system and the reflection-type light valve, and a shape of an exit pupil formed in the lighting optical system, which can be taken as a light-emitting surface when the lighting optical system is viewed from the schlieren bars, is such that a size in a direction parallel to a plane containing axes of light incident on and reflected from the reflection-type light valve is smaller than that in a direction perpendicular to that plane, and $\sin^{-1}(F4/2)$ and $\theta 2/2 + \sin^{-1}(F3/2)$ are substantially equal, where, among a lighting F number relative to the schlieren bars, $F3$ represents the lighting F number in the direction parallel to the plane containing the axes of the light incident on and reflected from the reflection-type light valve, $F4$ represents the lighting F number in the direction perpendicular to that plane, and $\theta 2$ represents an angle between the light incident on the reflection-type light valve and the light reflected from the reflection-type light valve into the projection optical system.

16. The projection display system according to claim 12, wherein the lighting optical system is an integrated optical system including a first lens array that divides light from the light source into separate rays of light to form secondary images of the light source and a second lens array provided with a plurality of microlenses arranged at the positions where the secondary images of the light source are formed, and an entire shape of the second lens array is such that a size in a direction parallel to a plane containing axes of light incident on and reflected from the reflection-type light valve is smaller than that in a direction perpendicular to that plane.

17. The projection display system according to claim 15, wherein the lighting optical system is an integrated optical system including a first lens array that divides light from the light source into separate rays of light to form secondary images of the light source and a second lens array provided with a plurality of microlenses arranged at the positions where the secondary images of the light source are formed, and an entire shape of the second lens array is such that a size in a direction parallel to a plane containing axes of light incident on and reflected from the reflection-type light valve is smaller than that in a direction perpendicular to that plane.

* * * * *